(12) United States Patent
Doshita et al.

(10) Patent No.: US 11,734,045 B2
(45) Date of Patent: Aug. 22, 2023

(54) CONSTRUCTION MANAGEMENT DEVICE, INFORMATION PROCESSING SYSTEM, AND NON-TRANSITORY COMPUTER-READABLE STORAGE MEDIUM

(71) Applicant: FUJITSU LIMITED, Kawasaki (JP)

(72) Inventors: Akihiro Doshita, Kawasaki (JP); Keiji Miyauchi, Yokohama (JP); Tsutomu Matsuura, Yamato (JP); Junichi Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 294 days.

(21) Appl. No.: 17/155,152

(22) Filed: Jan. 22, 2021

(65) Prior Publication Data

US 2021/0294631 A1 Sep. 23, 2021

(30) Foreign Application Priority Data

Mar. 19, 2020 (JP) ................................ 2020-048700

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01);
(Continued)

(58) Field of Classification Search
CPC ....... G06F 9/45558; G06F 2009/45562; G06F 2009/4557; G06F 2009/45575;
(Continued)

(56) References Cited

U.S. PATENT DOCUMENTS

| 10,129,162 B1* | 11/2018 | Faulk, Jr. ................ H04L 47/33 |
| 2015/0373105 A1* | 12/2015 | Okada ..................... G06F 3/067 |
| | | 709/219 |

(Continued)

FOREIGN PATENT DOCUMENTS

| JP | 2015-504224 A | 2/2015 |
| WO | 2013/109344 A1 | 7/2013 |
| WO | 2016/157274 A1 | 10/2016 |

*Primary Examiner* — Dong U Kim
(74) *Attorney, Agent, or Firm* — Fujitsu Patent Center

(57) ABSTRACT

A construction management device includes a processor. The processor configured to acquire virtual port construction data and connection definition data, the virtual port construction data being data for associating a plurality of virtual ports with a physical port used by a physical server for data transfer with a physical storage, and associating a response specification requested by middleware executed by a virtual server that operates in the physical server with each virtual port, the connection definition data being data for associating the virtual port with the physical storage, generate a first command for constructing the plurality of virtual ports in the physical port based on the virtual port construction data, transmit the first command to the physical server, generate a second command for connecting the physical server and the physical storage via the virtual port based on the connection definition data, and transmit the second command to the physical.

12 Claims, 22 Drawing Sheets

(52) U.S. Cl.
CPC .............. *G06F 2009/45575* (2013.01); *G06F 2009/45583* (2013.01); *G06F 2009/45595* (2013.01)

(58) Field of Classification Search
CPC . G06F 2009/45583; G06F 2009/45595; G06F 2009/45579
See application file for complete search history.

(56) References Cited

U.S. PATENT DOCUMENTS

| | | | |
|---|---|---|---|
| 2016/0328348 A1* | 11/2016 | Iba | G06F 9/45558 |
| 2017/0126552 A1* | 5/2017 | Pfaff | H04L 45/56 |
| 2017/0132044 A1 | 5/2017 | Kaneko | |
| 2018/0285021 A1* | 10/2018 | Akaike | G06F 3/0656 |
| 2018/0336046 A1* | 11/2018 | Miyauchi | G06F 9/45558 |
| 2020/0019478 A1* | 1/2020 | Miyata | G06F 3/0685 |
| 2020/0145282 A1* | 5/2020 | Copley | H04L 49/25 |
| 2020/0293210 A1* | 9/2020 | McBrearty | G06F 3/067 |

* cited by examiner

FIG. 3

| | | VIRTUAL PORT CONSTRUCTION INFORMATION | | |
|---|---|---|---|---|
| SERVER NAME | SERVER TYPE | VIRTUAL PORT NAME FOR STORAGE CONNECTION | PHYSICAL PORT NAME FOR STORAGE CONNECTION | RESPONSE SPECIFICATION NUMBER |
| H001 | M10 | 230000000e201011 | 210000000e201011 | 1 |
| H001 | M10 | 230000000e201012 | 210000000e201011 | 2 |
| H002 | M12 | 230000000e201013 | 210000000e201021 | 1 |
| H002 | M12 | 230000000e201014 | 210000000e201021 | 2 |
| H002 | M12 | 230000000e201015 | 210000000e201021 | 1 |
| H002 | M12 | 230000000e201016 | 210000000e201021 | 2 |
| ⋮ | | ⋮ | | ⋮ |

FIG. 4

SERVER CONNECTION GROUP INFORMATION

| SERVER CONNECTION GROUP NAME | VIRTUAL PORT NAME | RESPONSE SPECIFICATION NUMBER |
|---|---|---|
| H001-1 | 230000000e201011 | 1 |
| H001-2 | 230000000e201012 | 2 |
| H002-1 | 230000000e201013 | 1 |
| ... | ... | ... |

PORT CONNECTION GROUP INFORMATION

| PORT CONNECTION GROUP NAME | PORT NUMBER |
|---|---|
| TP00 | 0,2,4,6 |
| TP01 | 1,7 |
| TP02 | 3,5 |
| ... | ... |

STORAGE CONNECTION GROUP INFORMATION

| STORAGE CONNECTION GROUP NAME | Vol NAME | LUN |
|---|---|---|
| S001-1 | vd-1001 | 1001 |
| S001-2 | vd-1101 | 1101 |
| S002-1 | vd-1101 | 1101 |
| ... | ... | ... |

CONNECTION CONFIGURATION INFORMATION

| SERVER CONNECTION GROUP NAME | PORT CONNECTION GROUP NAME | STORAGE CONNECTION GROUP NAME |
|---|---|---|
| H001-1 | TP00 | S001-1 |
| H001-2 | TP00 | S001-2 |
| H002-1 | TP00 | S002-1 |
| ... | ... | ... |

FIG. 5

USER INFORMATION

| USER NAME | USER ID |
|---|---|
| AA CO., LTD. | 0001 |
| BB CO., LTD. | 0002 |
| CC CO., LTD. | 0003 |
| ... | ... |

SERVER INFORMATION

| USER ID | HOST NAME | VIRTUAL SERVER NAME | PHYSICAL SERVER NAME | CLUSTER GROUP NAME | RESPONSE SPECIFICATION NUMBER | MACHINE TYPE | OS TYPE |
|---|---|---|---|---|---|---|---|
| 0001 | AAA | Dom0001 | H001 | A | 1 | 2 | OS11u3 |
| 0001 | AAB | Dom0002 | H002 | B | 1 | 2 | OS11u3 |
| 0002 | BBA | Dom0003 | H001 | A | 2 | 3 | |
| 0002 | BBB | Dom0004 | H002 | B | 2 | 3 | |
| ... | ... | ... | ... | ... | ... | ... | ... |

STORAGE INFORMATION

| VIRTUAL SERVER NAME | LUN | ID | DISK NAME | DISK TYPE |
|---|---|---|---|---|
| Dom0001 | 1001 | 1001 | vd-1001 | SINGLE |
| Dom0001 | 1101 | 1101 | vd-1101 | SHARED |
| Dom0002 | 1101 | 1101 | vd-1101 | SHARED |
| Dom0003 | 1102 | 1102 | vd-1102 | SHARED |
| Dom0004 | 1102 | 1102 | vd-1102 | SHARED |
| ... | ... | ... | ... | ... |

LUN INFORMATION

| HOUSING NAME | Vol NAME | STORAGE CONNECTION GROUP NAME | LUN | RESPONSE SPECIFICATION NUMBER |
|---|---|---|---|---|
| ET200-1 | vd-1001 | S001-1 | 1001 | 1 |
| ET200-1 | vd-1101 | S001-1 | 1101 | 1 |
| ET200-1 | vd-1101 | S001-1 | 1101 | 1 |
| ... | ... | ... | ... | ... |

VOLUME INFORMATION

| HOUSING NAME | RAID GROUP NAME | Vol NUMBER | Vol NAME | SIZE |
|---|---|---|---|---|
| ET200-1 | RG#000 | 1001 | vd-1001 | 120GB |
| ET200-1 | RG#020 | 1101 | vd-1101 | 1TB |
| ET200-1 | RG#020 | 1101 | vd-1101 | 1TB |
| ... | ... | ... | ... | ... |

NETWORK INFORMATION

| VIRTUAL SERVER NAME | Vnet NAME | VLAN NAME | MAC | NET TYPE |
|---|---|---|---|---|
| Dom0001 | Vnet-g0 | 3010 | aaaaaaa | STANDARD |
| Dom0001 | Vnet-g1 | 1101 | bbbbbbb | INTERCONNECT |
| Dom0002 | Vnet-g0 | 1101 | bbbbbbc | INTERCONNECT |
| ... | ... | ... | ... | ... |

CONSTRUCTION MANAGEMENT DEVICE, INFORMATION PROCESSING SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-48700, filed on Mar. 19, 2020, the entire contents of which are incorporated herein by reference.

FIELD

The embodiment discussed herein is related to a construction management device, an information processing system, and a non-transitory computer-readable storage medium.

BACKGROUND

An information communication system constructed using a cloud computing platform is constructed using a virtual device generated from a physical device by a virtualization function. FIG. 19 is a diagram illustrating an example of the information communication system constructed using the cloud computing platform. As illustrated in FIG. 19, in a case of using a cloud computing platform 97, a platform virtual device 92 is generated from a platform physical device 91 by the virtualization function, and an information communication system 93 to be used by a user is constructed from the platform virtual device 92.

The platform physical device 91 includes a plurality of physical servers 91a, a plurality of network switches 91g, and a plurality of physical storages 91c. The platform virtual device 92 includes a plurality of virtual servers 92a, a plurality of virtual switches 92b, and a plurality of virtual storages 92c. The virtual server 92a, the virtual switch 92b, and the virtual storage 92c are controlled by a virtualization control software 92d. The platform physical device 91, the platform virtual device 92, association and connection between the platform physical device 91 and the platform virtual device 92, and the like are managed by a management device 90.

The information communication system 93 used by the user is constructed using the virtual server 92a, the virtual switch 92b, and the virtual storage 92c included in the platform virtual device 92. The virtual server 92a includes a central processing unit (CPU), a memory, and middleware, and executes the middleware. The virtual server 92a uses data stored in the virtual storage 92c and performs communication using a virtual network constructed by the virtual switch 92b.

There are two methods for ensuring availability in the information communication system 93 constructed using the cloud computing platform 97. FIGS. 20A and 20B are diagrams for describing the two methods for ensuring availability in the information communication system 93 constructed using the cloud computing platform 97. FIG. 20A illustrates a first method of re-operating the virtual server 92a on another physical server 91a, and FIG. 20B illustrates a second method of operating two virtual servers 92a.

In FIGS. 20A and 20B, a virtual server #1 and a virtual server #2 are the virtual servers 92a, and a physical server #1 and a physical server #2 are the physical servers 91a. An application 92e operates in the virtual server 92a, and the application 92e uses the virtual storage 92c.

As illustrated in FIG. 20A, in the first method, when an error has occurred in the physical server #1 (u81), connection of the physical storage 91c is switched from the physical server #1 to the physical server #2 (u82), and the virtual server #1 is restarted on the physical server #2 (u83). Meanwhile, as illustrated in FIG. 20B, in the second method, the two virtual servers 92a are operated and the virtual storage 92c is mirrored. Then, when an error has occurred in the physical server #1 (u91), the virtual server #1 is switched to the virtual server #2 (u92), and an internet protocol (IP) address is switched (u93).

However, in a cloud computing environment illustrated in FIGS. 19, 20A and 20B, a response specification of the physical storage 91c to the middleware operating on the virtual server 92a is not specified. Here, the response specification of the physical storage 91c is, for example, a specification of a response to the middleware regarding exclusive control for data protection when writing is performed from a plurality of virtual servers 92a.

In contrast, in an on-premises-based cluster system, a plurality of physical servers 91a and a shared physical storage 91c are used to ensure availability, and a response specification of the physical storage 91c to the middleware is specified. Here, the on-premises means that a user constructs an information communication system using his/her own physical device. Furthermore, the cluster system is an information communication system constructed by linking a plurality of physical servers 91a into one system.

FIG. 21 is a diagram illustrating a configuration of the on-premises-based cluster system. In FIG. 21, clusterware 91f is middleware used for constructing the cluster system. As illustrated in FIG. 21, in the on-premises-based cluster system, the physical storage 91c is shared by the physical server #1 and the physical server #2, and response specification settings that meet requirements of clusterware 91f are needed for the physical storage 91c.

In a case of implementing the on-premises-based cluster system illustrated in FIG. 21 using a cloud computing platform, the cloud computing platform capable of configuring virtual servers in a form close to a physical device configuration is needed unlike the cloud computing platform 97 illustrated in FIG. 19.

FIG. 22 is a diagram illustrating an example of an information communication system 93a constructed using a cloud computing platform 97a capable of configuring virtual servers in a form close to a physical device configuration. As illustrated in FIG. 22, the information communication system 93a includes a cluster system of a user A and a cluster system of a user B.

The cluster system of the user A includes the virtual server 92a represented by a virtual server #a1 and a virtual server #a2, the virtual storage 92c represented by a virtual storage #1, and a virtual network including the virtual switches 92b represented by s #1 and s #2. Middleware 92f represented by middleware #1 operates on the virtual server #a1 and the virtual server #a2. The virtual storage #1 is shared by the virtual server #a1 and the virtual server #a2. A response specification #1 requested by the middleware #1 is set in the virtual storage #1.

The cluster system of the user B includes the virtual server 92a represented by a virtual server #b1 and a virtual server #b2, the virtual storage 92c represented by a virtual storage #2, and a virtual network including the virtual switches 92b represented by s #3 and s #4. The middleware 92f represented by middleware #2 operates on the virtual server #b1 and the virtual server #b2. The virtual storage #2 is shared by the virtual server #b1 and the virtual server #b2. A response specification #2 requested by the middleware #2 is set in the virtual storage #2.

The virtual server 92a includes a CPU and a memory. The virtual servers 92a are connected by the virtual network including the virtual switches 92b. The virtual switch 92b is implemented by virtualization of an interconnect network switch 91b and a standard network switch 91d.

The virtual server #a1 operates on the physical server #1, and the virtual server #a2 operates on the physical server #2. The virtual server #b1 operates on the physical server #3, and the virtual server #b2 operates on the physical server #4. The physical servers #1 to #4 are connected to the physical storage 91c via an FC switch 94. The physical storage 91c provides a logical unit 95 identified by logical unit number (LUN) #1a and LUN #1b. The LUN is a number for identifying the logical unit 95. The LUN #1a is the logical unit 95 that implements the virtual storage #1 used by the user A, and the LUN #1b is the logical unit 95 that implements the virtual storage #2 used by the user B. The LUN #1a is shared by the virtual server #a1 and the virtual server #a2, The LUN #1b is shared by the virtual server #b1 and the virtual server #b2.

The response specification #1 is associated with the physical server #1, the physical server #2, a physical port 96 of the physical server #1, a physical port 96 of the physical server #2, and the LUN #1a. The response specification #2 is associated with the physical server #3, the physical server #4, a physical port 96 of the physical server #3, a physical port 96 of the physical server #4, and the LUN #1b.

Note that, as prior art, there is a management computer that generates a configuration plan for implementing allocation of a storage area according to an access characteristic of a host computer. The management computer stores configuration information including information of a plurality of storage media having different performances provided by the host computer and a storage device, and indicating the storage areas provided by the storage media and the host computer in association with one another. Then, when the management computer receives a request of allocating the storage area to the host computer, including information of characteristics of an access by the host computer and a capacity of the storage area to be allocated, the management computer refers to the configuration information. Then, the management computer selects the storage medium capable of providing the storage area with the requested capacity on the basis of the access characteristics included in the request from among the storage media provided by the storage device and the host computer. Then, the management computer generates and outputs the configuration plan for allocating the storage area from the selected storage medium to the host computer.

Furthermore, as prior art, there is a technique of basing virtual machine (VM) arrangement on performance characteristics of a storage array and network layer metrics to improve VM performance because there are many cases where a storage is needed when meeting the application requirement.

International Publication Pamphlet No. WO 2016/157274 and Japanese National Publication of International Patent Application No. 2015-504224 are disclosed as related art.

SUMMARY

According to an aspect of the embodiments, a construction management device includes a memory and a processor connected to the memory. The processor configured to: acquire virtual port construction data and connection definition data, the virtual port construction data being data for associating a plurality of virtual ports with a physical port used by a physical server for data transfer with a physical storage, and associating a response specification requested by middleware executed by a virtual server that operates in the physical server with each virtual port, the connection definition data being data for associating the virtual port with the physical storage, generate a first command for constructing the plurality of virtual ports in the physical port based on the virtual port construction data, transmit the first command to the physical server, generate a second command for connecting the physical server and the physical storage via the virtual port based on the connection definition data, and transmit the second command to the physical storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of virtual port construction data;

FIG. 4 is a diagram illustrating an example of connection definition data;

FIG. 5 is a diagram illustrating an example of configuration definition data;

DESCRIPTION OF EMBODIMENTS

Figure 22:
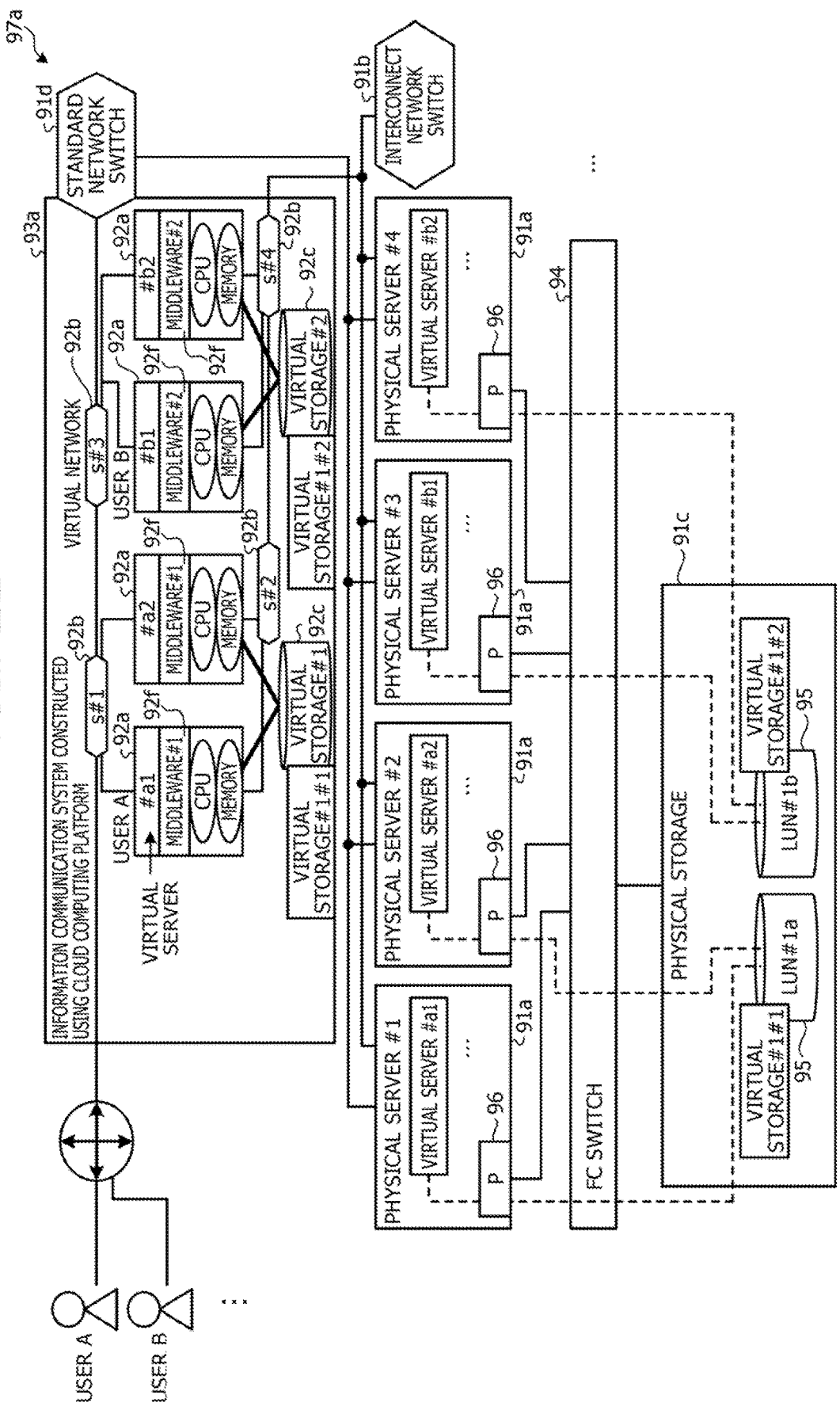
FIG. 22 is a diagram illustrating an example of an information communication system constructed using a cloud computing platform capable of configuring virtual servers in a form close to a physical device configuration.

In the prior art, in the cloud computing platform 97a illustrated in FIG. 22, the response specification of the physical storage 91c is associated with each physical server. For example, the physical server #1 and the physical server #2 are associated with the response specification #1, and the physical server #3 and the physical server #4 are associated with the response specification #2. Therefore, when deploying the virtual server 92a to the physical server 91a, the virtual server 92a needs to be deployed on the basis of the response specification associated with the physical server 91a. For example, the virtual server 92a on which the middleware 92f of the response specification #1 operates needs to be deployed to the physical server #1 or the physical server #2.

Therefore, the cloud computing platform 97a illustrated in FIG. 22 has a problem that the physical server 91a is not able to be efficiently used. For example, when there are many users who use the middleware 92f of the response specification #1, the physical server #1 and the physical server #2 are often used, and the physical server #3 and the physical server #4 are rarely used.

One aspect of the present embodiment is to efficiently use a physical server in a cloud computing platform that implements an on-premises-based information communication system.

Hereinafter, embodiments of a construction management device, an information processing system, and a construction management program disclosed in the present application will be described in detail with reference to the drawings. Note that the embodiments do not limit the technology disclosed.

Embodiment

Figure 1A:
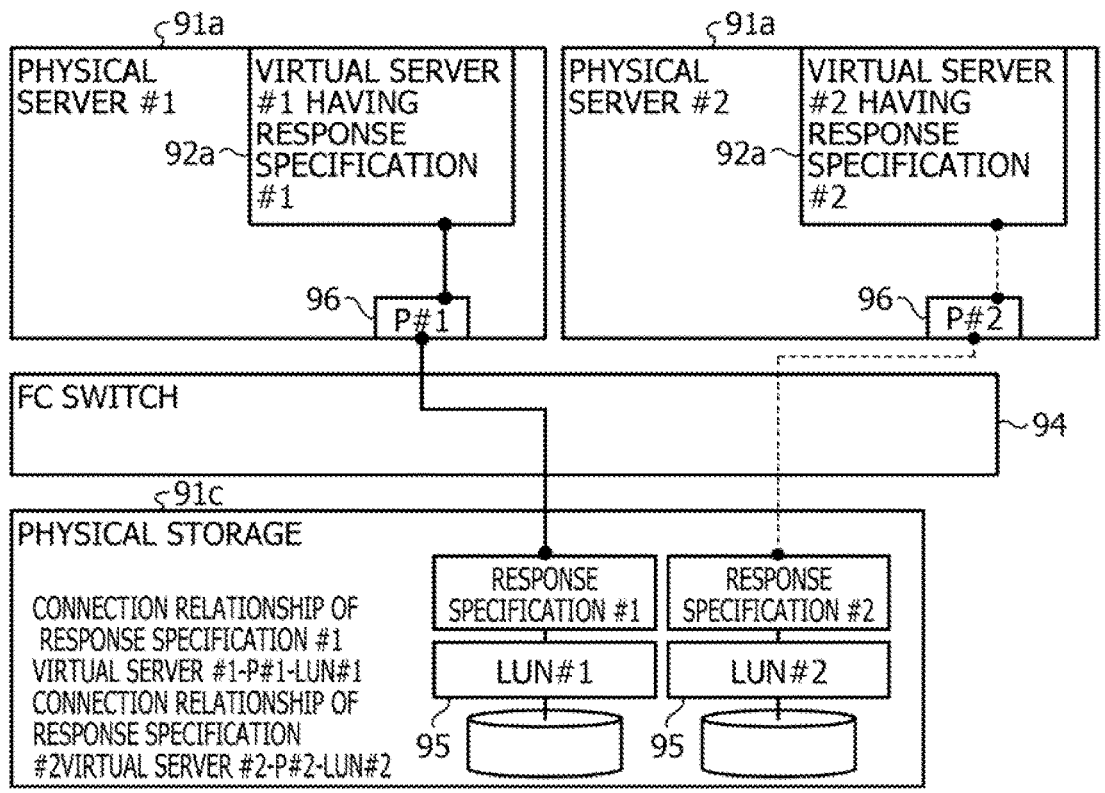
FIG. 1A is diagram for describing a virtual port according to an embodiment.
Figure 1B:
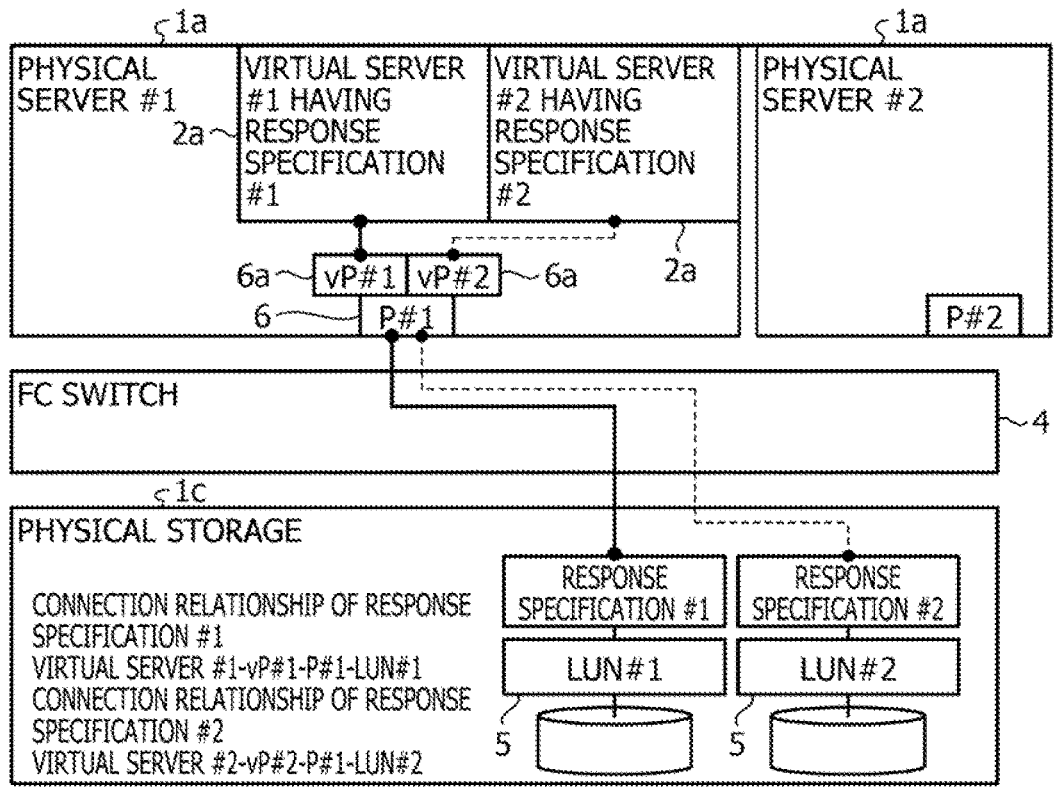
FIG. 1B is diagram for describing a virtual port according to an embodiment.

First, a virtual port according to an embodiment will be described. FIGS. 1A and 1B are diagrams for describing a virtual port according to an embodiment. FIG. 1A illustrates the past connection between the virtual server 92a and the logical unit 95 using the physical port 96. FIG. 1B illustrates connection of an embodiment between a virtual server 2a and a logical unit 5 using a virtual port 6a. In FIG. 1A, the virtual server #1 and the virtual server #2 are the virtual servers 92a, and the LUN #1 and the LUN #2 are the logical units 95. In FIG. 1B, a virtual server #1 and a virtual server #2 are the virtual servers 2a, and an LUN #1 and an LUN #2 are the logical units 5. Note that, in FIGS. 1A and 1B, the virtual server #1 uses the LUN #1 of the response specification #1, and the virtual server #2 uses the LUN #2 of the response specification #2. Furthermore, in FIG. 1B, vP #1 and vP #2 are the virtual ports 6a constructed on a physical port P #1.

As illustrated in FIG. 1A, in the past, the virtual server 92a is connected to the logical unit 95, using the physical port 96. Therefore, the connection relationship of the response specification #1 is virtual server #1-P #1-LUN #1, and the connection relationship of the response specification #2 is virtual server #2-P #2-LUN #2, That is, the virtual server #1 and the virtual server #2 are not able to operate on the same physical server 91a because the response specifications for the logical unit 95 are different.

Meanwhile, in the embodiment, as illustrated in FIG. 1B, the virtual server 2a is connected to the logical unit 5, using one of the plurality of virtual ports 6a constructed on a physical port 6, Therefore, the connection relationship of the response specification #1 is virtual server #1-vP #1-P #1-LUN #1, and the connection relationship of the response specification #2 is virtual server #2-vP #2-P #1-LUN #2. That is, the virtual server #1 and the virtual server #2 are able to operate on the same physical server 1a even if the response specifications of the logical unit 5 are different.

As described above, in the embodiment, since the virtual server 2a is connected to the logical unit 5 using the virtual port 6a, a plurality of virtual servers 2a having different response specifications of the logical unit 5 are able to be deployed on one physical server 1a.

Figure 2:
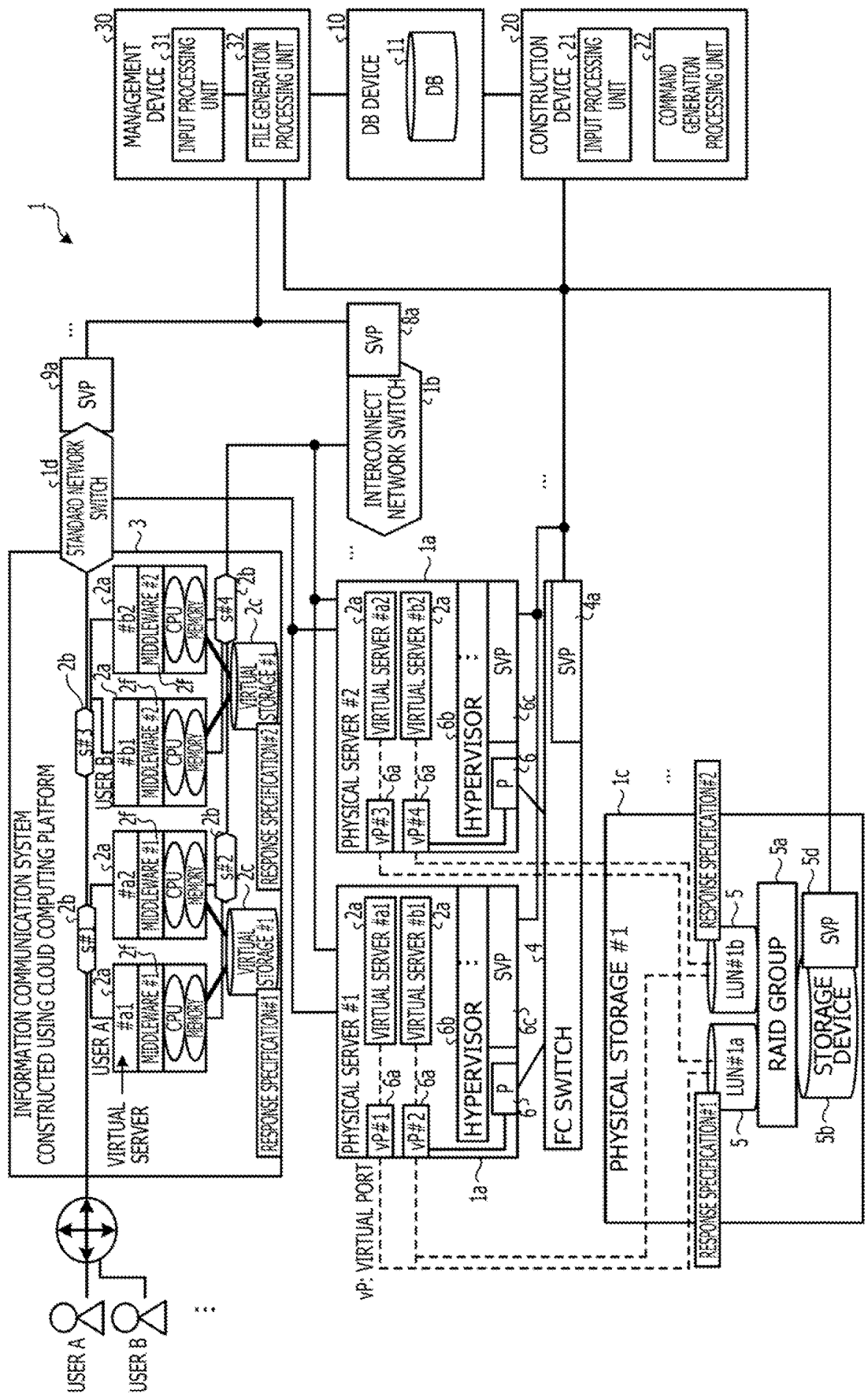
FIG. 2 is a diagram illustrating a configuration of an information processing system according to an embodiment.

Next, a configuration of an information processing system according to the embodiment will be described. FIG. 2 is a diagram illustrating the configuration of the information processing system according to the embodiment. As illustrated in FIG. 2, an information communication system 3 constructed using a cloud computing platform includes a cluster system of a user A and a cluster system of a user B.

The cluster system of the user A includes the virtual servers 2a represented by a virtual server #a1 and a virtual server #a2, a virtual storage 2c represented by a virtual storage #1, and a virtual network including virtual switches 2b represented by s #1 and s #2. Middleware 2f represented by middleware #1 operates on the virtual server #a1 and the virtual server #a2. The virtual storage #1 is shared by the virtual server #a1 and the virtual server #a2. A response specification #1 requested by the middleware #1 is set in the virtual storage #1.

The cluster system of the user B includes the virtual servers 2a represented by a virtual server #b1 and a virtual server #b2, the virtual storage 2c represented by a virtual storage #2, and a virtual network including the virtual switches 2b represented by s #3 and s #4. The middleware 2f represented by middleware #2 operates on the virtual server #b1 and the virtual server #b2. The virtual storage #2 is shared by the virtual server #b1 and the virtual server #b2. A response specification #2 requested by the middleware #2 is set in the virtual storage #2.

The virtual server 2a includes a CPU and a memory. The virtual servers 2a are connected by the virtual network including the virtual switches 2b. Here, the virtual server 2a, the virtual network, and the virtual storage 2c are collectively referred to as virtual resources.

An information processing system 1 according to the embodiment includes a plurality of physical servers 1a represented by a physical server #1, a physical server #2, and the like, an interconnect network switch 1b, a plurality of standard network switches 1d, and a plurality of FC switches 4. Furthermore, the information processing system 1 includes a plurality of physical storages 1c represented by a physical storage #1, and the like, a DB device 10, a construction device 20, and a management device 30.

The physical server 1a includes the physical port 6 represented by P and a service processes (SVP) 6c. The physical port 6 is used for data transfer to and from the physical storage 1c. The SVP 6c monitors and controls the physical server 1a.

The plurality of virtual servers 2a and a hypervisor 6b operate on the physical server 1a. The virtual server #a1, the virtual server #b1, and the like operate on the physical server #1, and the virtual server #a2, the virtual server #b2, and the like operate on the physical server #2. The hypervisor 6b has a virtualization function and manages and controls the virtual resources.

The virtual port 6a is constructed on the physical server 1a. The virtual ports vP #1 and vP #2 are constructed on the physical server #1, and the virtual ports vP #3 and vP #4 are constructed on the physical server #2.

The interconnect network switch 1b is a switch that connects the physical servers 1a. The interconnect network switch 1b is connected to the management device 30. The interconnect network switch 1b includes an SVP 8a. The SVP 8a monitors and controls the interconnect network switch 1b.

The standard network switch 1d is a switch that connects the information processing system 1 to an external network such as the Internet. The standard network switch 1d is connected to the physical server #1, the physical server #2, and the like, and the management device 30. The standard network switch 1d includes an SVP 9a. The SVP 9a monitors and controls the standard network switch 1d.

The FC switch 4 is a switch that connects the plurality of physical servers 1a and the plurality of physical storages 1c. The FC switch 4 includes an SVP 4a. The SVP 4a monitors and controls the FC switch 4.

The physical storage 1c is a non-volatile storage device that stores data used by the virtual server 2a. The physical storage 1c provides the logical unit 5 represented by the LUN #1a and the LUN #1 b. The LUN #1a is the logical unit 5 that implements the virtual storage #1 used by the user A, and the LUN #1b is the logical unit 5 that implements the virtual storage #2 used by the user B. The LUN #1a is shared by the virtual server #a1 and the virtual server #a2. The response specification #1 is set in the LUN #1a. The LUN #1b is shared by the virtual server #b1 and the virtual server #b2. The response specification #2 is set in the LUN #1b.

The response specification #1 is associated with the virtual port vP #1 of the physical server #1, the virtual port vP #3 of the physical server #2, and the LUN #1a. The response specification #2 is associated with the virtual port vP #2 of the physic& server #1, the virtual port vP #4 of the physical server #2, and the LUN #1b.

The logical unit 5 is implemented by redundant arrays of inexpensive disks (RAID) group 5a, The RAID group 5a includes a storage device 5b including a plurality of disk devices, solid state drive (SSD) devices, or the like. The physical storage 1c includes an SVP 5d. The SVP 5d monitors and controls the physical storage 1c.

Note that, here, the interconnect network switch 1b and the standard network switch 1d are collectively referred to as a physical network switch 1e, and the SVP 8a and the SVP 9a are collectively referred to as an SVP 9e, Furthermore, the physical server 1a, the physical network switch 1e, and the physical storage 1c are collectively referred to as physical resources.

The DB device 10 includes a DB 11, and stores information regarding virtualization, information regarding connection between physical resources, and the like in the DB 11. For example, the DB 11 stores virtual port construction data, connection definition data, and configuration definition data.

The virtual port construction data is data used for constructing the virtual port 6a. FIG. 3 is a diagram illustrating an example of the virtual port construction data. As illustrated in FIG. 3, the virtual port construction data includes virtual port construction information. The virtual port construction information is information that associates a server name, a server type, a virtual port name for storage connection, a physical port name for storage connection, and a response specification number.

The server name is a name for identifying the physical server 1a. The server type is a type of the physical server 1a. For example, the number of CPUs, memory capacity, and the number of physical ports 6 differ depending on the server type. The virtual port name for storage connection is a name for identifying the virtual port 6a used for connection with the physical storage 1c in the physical server 1a. The physical port name for storage connection is a name for identifying the physical port 6 used for connection with the physical storage 1c in the physical server 1a. The response specification number is a number for identifying a response specification set in the virtual port 6a.

For example, the virtual port 6a "230000000e201011" is constructed on the physical port 6 "210000000e201011" of the physical server 1a "H001" of the server type "M10", and the response specification number is "1".

The connection definition data is data used for connecting the virtual port 6a of the physical server 1a and the physical storage 1c. FIG. 4 is a diagram illustrating an example of the connection definition data. As illustrated in FIG. 4, the connection definition data includes connection configuration information, server connection group information, port connection group information, and storage connection group information.

The connection configuration information is information for associating a server connection group name, a port connection group name, and a storage connection group name. The server connection group name is a name for identifying a group of the virtual port 6a of the physical server 1a and the response specification. The port connection group name is a name for identifying a group of ports in the physical storage 1c. The storage connection group name is a name for identifying a group of a volume and the logical unit 5. For example, the server connection group name "H001-1", the port connection group name "TP00", and the storage connection group name "S001-1" are associated with one another.

The server connection group information is information for associating the server connection group name with a group of the virtual port name and the response specification number. For example, the server connection group name "H001-1" is associated with a group of the virtual port name "230000000e201011" and the response specification number "1".

The port connection group information is information for associating the port connection group name with a group of port numbers of the physical storage 1c. For example, the port connection group name "TP00" is associated with a group of the port numbers "0", "2", "4", and "6" of the physical storage 1c.

The storage connection group information is information for associating the storage connection group name with a group of a volume (Vol) name and an LUN. For example, the storage connection group name "S001-1" is associated with a group of the Vol name "vd-1001" and the LUN "1001".

The configuration definition data is data used for creating the virtual resources and connecting the virtual resources. FIG. 5 is a diagram illustrating an example of the configuration definition data. As illustrated in FIG. 5, the configuration definition data includes user information, server information, storage information, LUN information, volume information, and network information.

The user information is information for associating a user name with a user ID. The user name is a name for identifying a user. The user ID is an identifier for identifying the user. For example, the user name "AA Co., Ltd." is associated with the user ID "0001".

The server information is information for associating the user ID, a host name, a virtual server name, a physical server name, a cluster group name, the response specification number, a machine type, and an operating system (OS) type. The host name is a name for identifying a host implemented by the virtual server 2a. The virtual server name is a name for identifying the virtual server 2a. The physical server name is a name for identifying the physical server 1a. The cluster group name is a name for identifying a cluster group. The machine type is a type of virtual server 2a. The OS type is a type of an OS. For example, the user ID "0001", the host name "AAA", the virtual server name "Dom0001", the physical server name "H001", the cluster group name "A", the response specification number "1", the machine type "2", and the OS type "Os11u3" are associated.

The storage information is information for associating the virtual server name, a LUN, an ID, a disk name, and a disk type. The ID is an identifier used by the user for identifying a storage. The disk name is the name used by the user for specifying a storage. The disk type indicates whether a storage is shared. For example, the virtual server name "Dom0001", the LUN "1001", the ID "1001", the disk name "vd-1001", and the disk type "single" are associated.

The LUN information is information for associating a housing name, the Vol name, the storage connection group name, the LUN, and the response specification number. The housing name is a name for identifying a housing in which the physical storage 1c is stored. For example, the logical unit 5 of the response specification number "1" and the LUN "1001" is identified by "5001-1" as a group with the volume of the Vol name "vd-1001", and is located in the housing of the housing name "ET200-1".

The volume information is information for associating the housing name, a RAID group name, a Vol number, the Vol name, and a size. The RAID group name is a name for identifying the RAID group 5a. The size is the size of a volume. For example, the volume with the Vol number "1001" and the Vol name "vd-1001" has the size "120 GB", is constructed by the RAID group "RG #000", and is located in the housing of the housing name "ET200-1".

The network information is information for associating the virtual server name, a Vnet name, a virtual local area network (VLAN) number, a media access control (MAC), and a net type. The Vnet name is a name for identifying a virtual network. The VLAN number is a number for identifying a VLAN. The MAC is a MAC address. The net type indicates whether a network is a network constructed using the standard network switch 1d (standard) or a network constructed using the interconnect network switch 1b (interconnect). For example, the virtual server name "Dom0001", the Vnet name "Vnet-g0", the VLAN number "3010", the MAC "aaaaaaa", and the net type [standard] are associated.

Returning to FIG. 2, the construction device 20 constructs the virtual port 6a and performs processing of connecting the physical server 1a and the physical storage 1c on the basis of the virtual port construction data and the connection definition data. The construction device 20 includes an input processing unit 21 and a command generation processing unit 22.

The input processing unit 21 inputs (acquires) the virtual port construction data, performs a duplicate check, and stores the data in the DB device 10. Furthermore, the input processing unit 21 inputs (acquires) the connection definition data and stores the data in the DB device 10.

The command generation processing unit 22 generates a command for constructing the virtual port 6a on the physical server 1a on the basis of the virtual port construction data, and transmits the command to the SVP 6c of the physical server 1a. Furthermore, the command generation processing unit 22 generates a command for performing server storage connection processing, which is processing of connecting the physical server 1a and the physical storage 1c via the virtual port 6a, on the basis of the connection definition data, and transmits the command to the SVP 5d of the physical storage 1c. The command generation processing unit 22 can increase security by instructing the SVP 4a of the FC switches 4 to execute processing (zoning processing) of defining a combination of ports of the physical server 1a and the physical storage 1c allowed to be connected by the FC switch 4 Note that the command generation processing unit 22 may perform processing of incorporating the FC switch 4.

Furthermore, the command generation processing unit 22 generates a command for creating a basic disk and transmits the command to the SVP 5d of the physical storage 1c. Here, the basic disk is a volume used for starting the hypervisor 6b and the OS. Furthermore, the command generation processing unit 22 generates a command for incorporating the basic disk and transmits the command to the SVP 6c of the physical server 1a.

Figure 6:
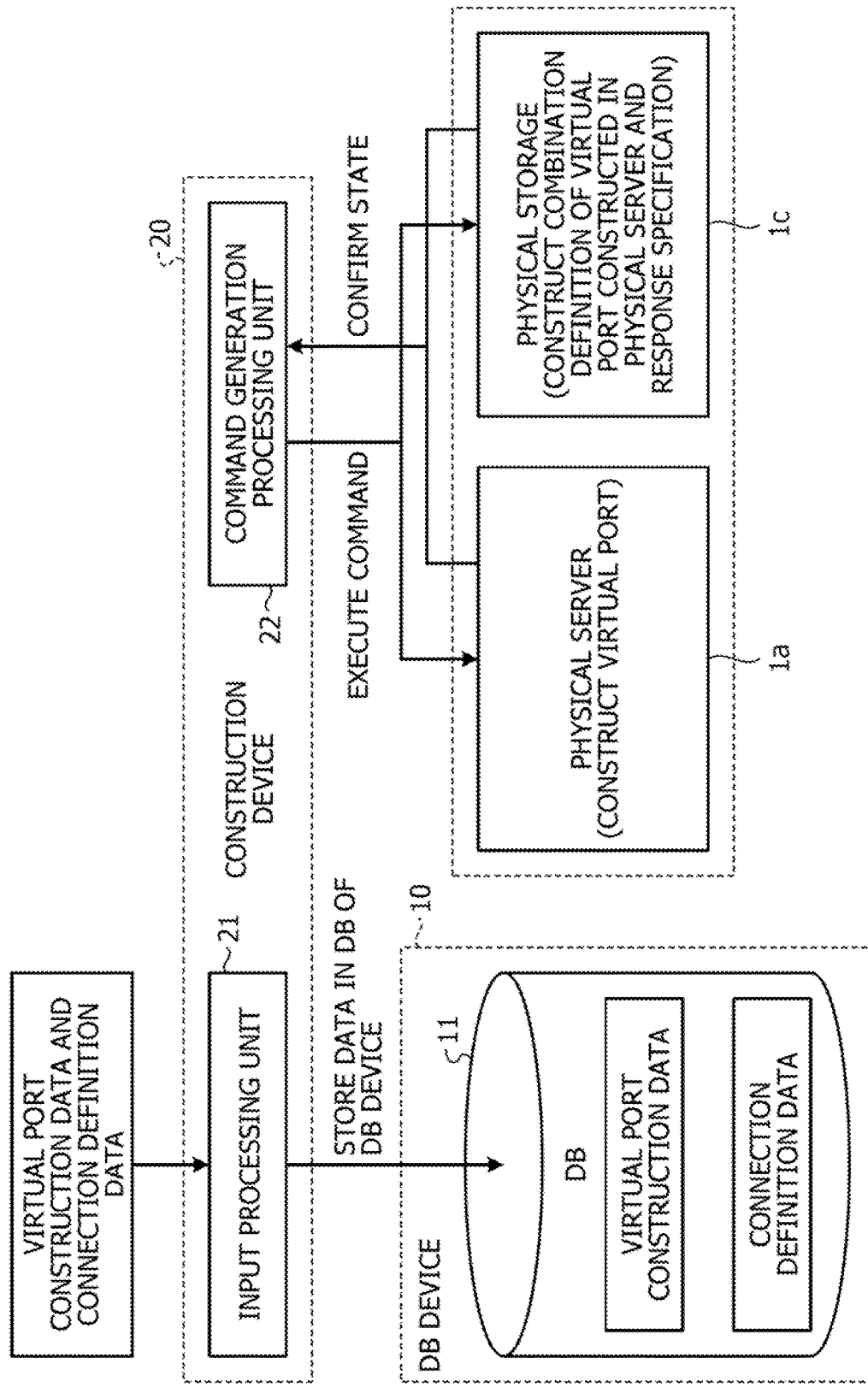
FIG. 6 is a diagram for describing a mechanism of command generation and processing of a construction device.

FIG. 6 is a diagram for describing a mechanism of command generation and processing of the construction device 20. As illustrated in FIG. 6, the input processing unit 21 inputs the virtual port construction data and the connection definition data, and stores the data in the DB 11 of the DB device 10.

The command generation processing unit 22 generates the command for constructing the virtual port 6a, and instructs the physical server 1a to execute the command. The physical server 1a constructs the virtual port 6a by executing the command. The command generation processing unit 22 confirms the construction of the virtual port 6a, and transmits a confirmation result to the DB device 10. The DB device 10 reflects the confirmation result in the DB 11.

Furthermore, the command generation processing unit 22 generates a command for performing processing of connecting the physical server 1a and the physical storage 1c via the virtual port 6a, and instructs the physical storage 1c to execute the command. The physical storage 1c executes the command to perform the processing of connecting the physical server 1a and the physical storage is via the virtual port 6a. By the processing, the physical storage is constructs a combination definition of the response specification and the virtual port 6a constructed by the physical server 1a. The command generation processing unit 22 confirms the connection between the physical server 1a and the physical storage 1c, and transmits a confirmation result to the DB device 10. The DB device 10 reflects the confirmation result in the DB 11.

In a case where the virtual port construction data or connection definition data is changed due to addition of a physical server or the like, the input processing unit 21 generates a command for adding or deleting the virtual port 6a on the basis of a difference before and after the change and transmits the command to the physical server 1a. Furthermore, the command generation processing unit 22 generates a command for processing of adding or deleting connection between the physical server 1a and the physical storage 1c, and transmits the command to the physical storage 1c. Then, the command generation processing unit 22 updates the DB 11.

Returning to FIG. 2, the management device 30 creates the virtual resources based on the configuration definition data, and performs processing of connecting the created virtual resources, and the like. For example, the management device 30 constructs a cluster system configuration that satisfies a storage response specification requirement of the middleware 2f based on at least the information of the physical server is and the information of the duster group of the configuration definition data. Furthermore, the management device 30 constructs a cluster system configuration independent of the physical server 1a on the basis of the information of the physical server 1a, shared information of the logical unit 5, and information of a connection group for the logical unit 5 associated with the virtual port 6a.

Furthermore, the management device 30 performs processing of connecting the virtual server 2a, the virtual port 6a, and the logical unit 5 based on the response specification of the middleware 2f of the virtual server 2a, The management device 30 includes an input processing unit 31 and a file generation processing unit 32. The input processing unit 31 inputs (acquires) the configuration definition data and stores the data in the DB device 10.

For example, the file generation processing unit 32 generates a command for creating the logical unit 5 that implements the virtual storage 2c on the basis of the configuration definition data, and writes the generated command to a control file. Furthermore, the file generation processing unit 32 generates a virtual port connection command for connecting the logical unit 5 and the virtual port 6a on the basis of the response specification of the middleware 2f, and writes the generated command to the control file. Then, the file generation processing unit 32 transmits a control command generated in the control file to the SVP 5d of the physical storage 1c. In the case of a shared storage, the file generation processing unit 32 connects the logical unit 5 to the virtual ports 6a of the plurality of physical servers 1a.

Furthermore, the file generation processing unit 32 generates a command for creating the virtual network on the basis of the configuration definition data, and writes the generated command to the control file. Then, the file generation processing unit 32 transmits the control command generated in the control file to the SVP 8a in the case of the command related to the interconnect network switch 1b, and transmits the control file generated in the control file to the SVP 9a in the case of the command related to the standard network switches 1d.

Furthermore, the file generation processing unit 32 generates a command for incorporating a multipath driver on the basis of the configuration definition data, and writes the generated command to the control file. Then, the file generation processing unit 32 transmits the control command generated in the control file to the SVP 6c of the physical server 1a.

Furthermore, the file generation processing unit 32 generates a command for incorporating the virtual resources on the basis of the configuration definition data, and writes the generated command to the control file. Then, the file generation processing unit 32 transmits the control command generated in the control file to the hypervisor 6b.

Furthermore, the file generation processing unit 32 generates a command for constructing the virtual server 2a on the basis of the configuration definition data, and writes the generated command to the control file. Then, the file generation processing unit 32 transmits the control command generated in the control file to the hypervisor 6b.

In a case where the configuration definition data is changed, the file generation processing unit 32 generates a command for adding or deleting the virtual resources and connection between the virtual resources, a command for incorporating or disconnecting the virtual resources, or the like on the basis of the difference before and after the change, and writes the generated command to the control file. Then, the file generation processing unit 32 transmits the control command generated in the control file to the related physical resources.

Figure 7:
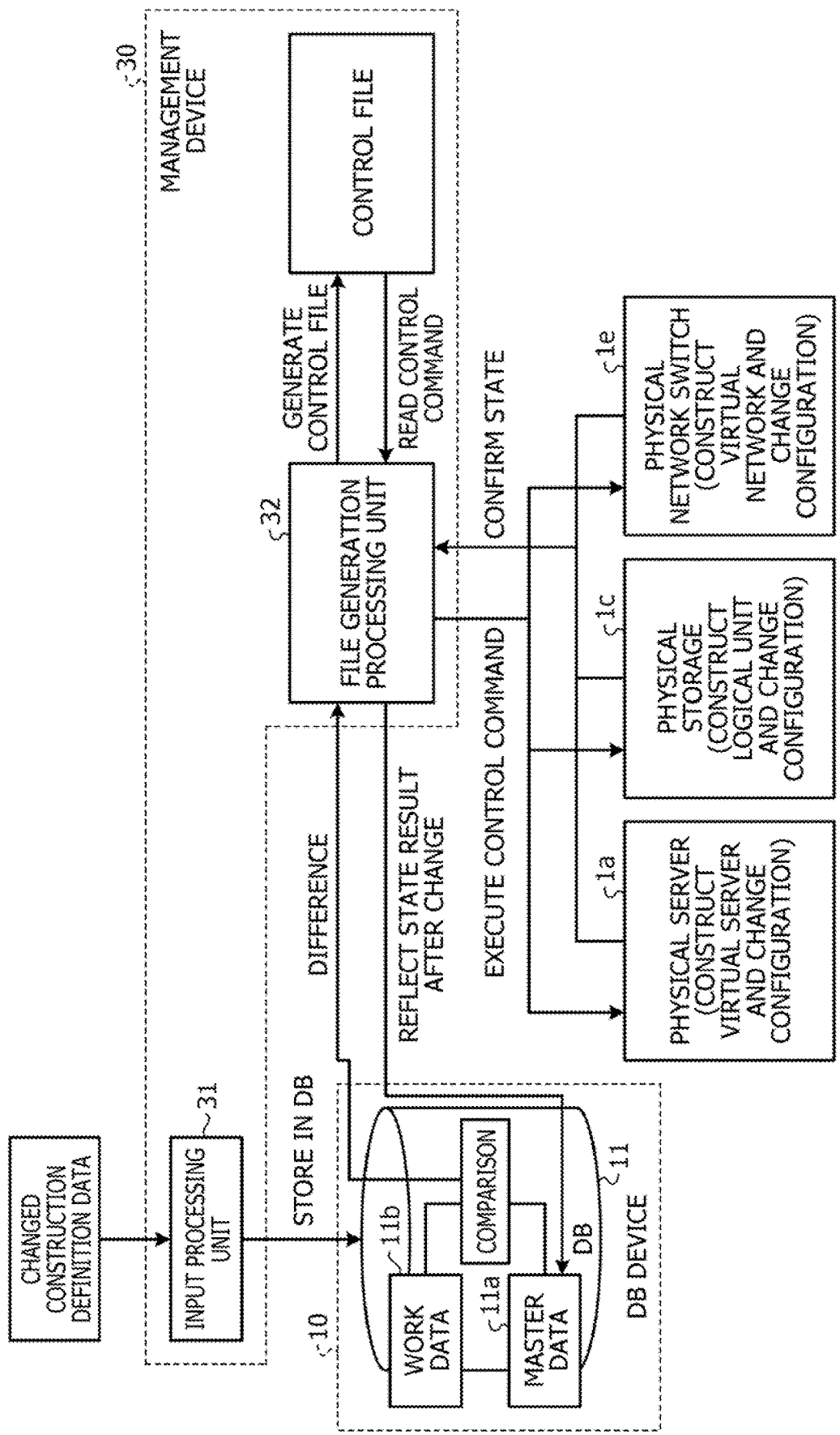
FIG. 7 is a diagram for describing a mechanism of command generation and processing of a management device.

FIG. 7 is a diagram for describing a mechanism of command generation and processing of the management device 30. As illustrated in FIG. 7, the input processing unit 31 inputs the changed configuration definition data and stores the data in the DB 11 of the DB device 10. The DB device 10 stores configuration data before the change as master data 11a, and stores the changed configuration definition data in the DB 11 as work data 11b. Then, the DB device 10 compares the master data 11a with the work data 11b, and transmits a difference to the file generation processing unit 32. Note that, when the input processing unit 31 first inputs the configuration definition data, there is no master data 11a.

The file generation processing unit 32 generates the control file including the command for changing the virtual resources on the basis of the difference. Then, the file generation processing unit 32 reads the control command generated in the control file and transmits the control command to the physical server 1a, the physical storage 1c, and the physical network switch 1e, and instructs execution of the control command. The physical server 1a, the physical storage 1c, and the physical network switch 1e execute the control command. The file generation processing unit 32 confirms an execution status of the control command and transmits a confirmation result to the DB device 10. The DB device 10 reflects the confirmation result in the master data Ha.

Figure 8:
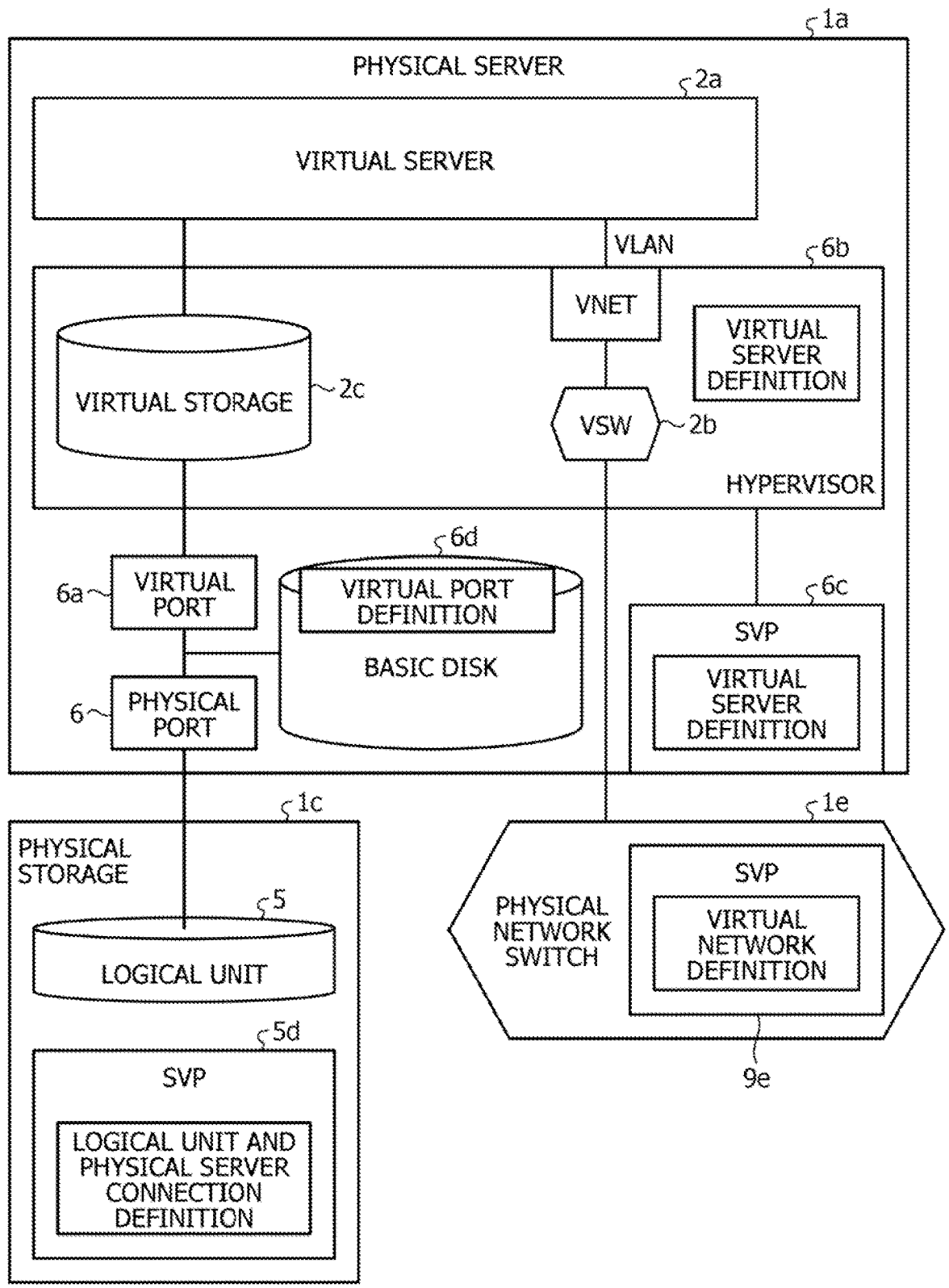
FIG. 8 is a diagram illustrating configurations of virtual resources and physical resources.

FIG. 8 is a diagram illustrating configurations of the virtual resources and the physical resources. As illustrated in FIG. 8, the virtual server 2a and the hypervisor 6b operate on the physical server 1a. The hypervisor 6b provides the virtual storage 2c to the virtual server 2a. Furthermore, the hypervisor 6b also provides a virtual network (VNET) including the virtual switch (VSW) 2b. At this time, a specific VLAN is assigned to the VNET.

The virtual port 6a is constructed on the physical server 1a. Furthermore, a basic disk 6d is incorporated in the physical server 1a, and a virtual port definition is stored in the basic disk 6d. Furthermore, the hypervisor 6b and the SVP 6c of the physical server 1a store a virtual server definition.

In the SVP 9e of the physical network switch 1e, the virtual network is defined and stored so that a plurality of virtual networks (VLANs) can be used by the connected physical server 1a. The SVP 5d of the physical storage is stores a connection definition between logical unit 5 and physical server 1a.

Figure 9:
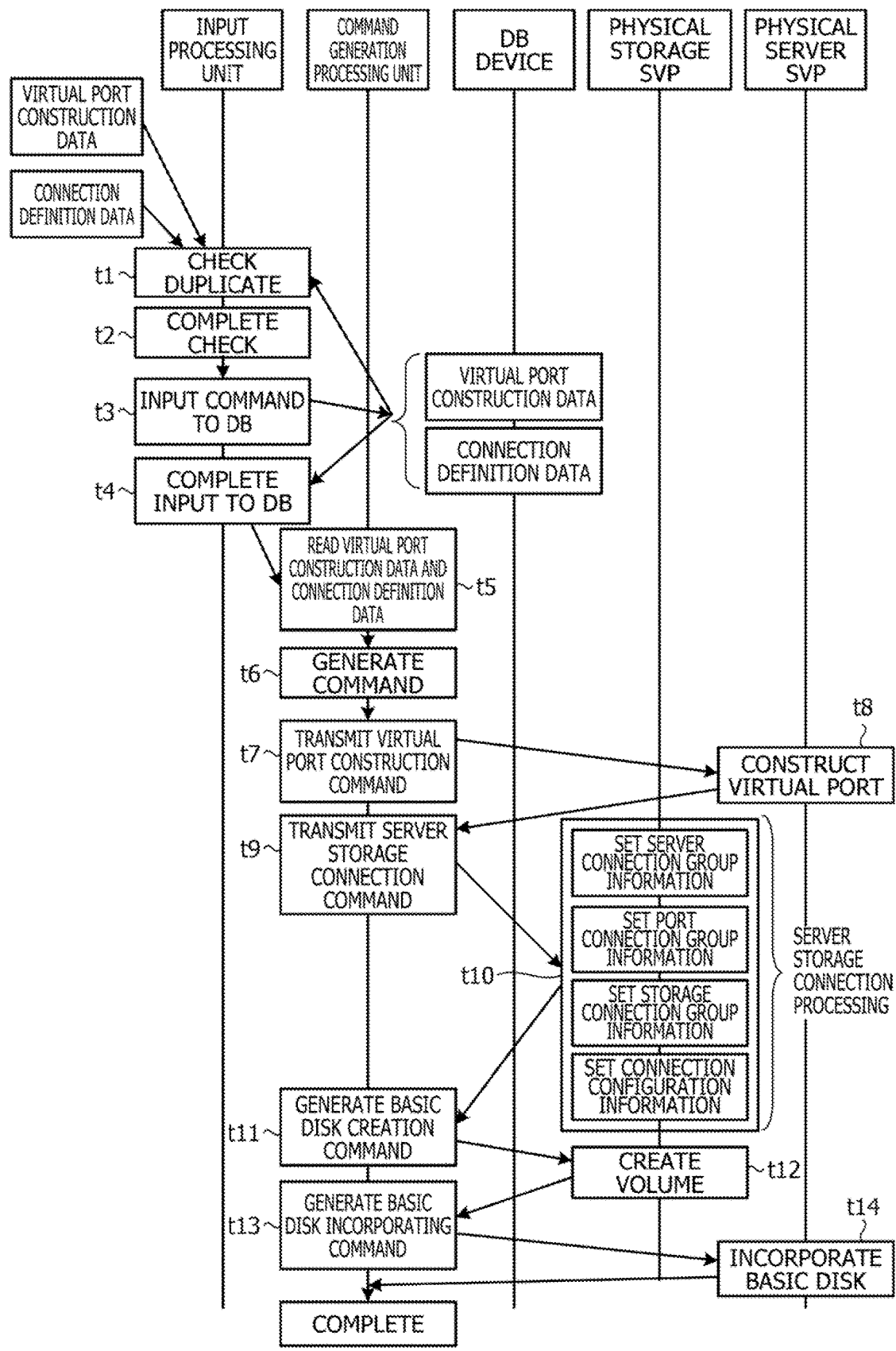
FIG. 9 is a diagram illustrating a sequence of processing by the construction device.

Next, a sequence of construction processing by the construction device 20 will be described. FIG. 9 is a diagram illustrating a sequence of the processing by the construction device 20. As illustrated in FIG. 9, the input processing unit 21 inputs the virtual port construction data and the connection definition data, performs a duplicate check between the input data and the existing virtual port construction data and connection definition data stored in the DB 11 of the DB device 10 (t1), and completes the check (t2). Then, the input processing unit 21 transmits an input command of the virtual port construction data and the connection definition data to the DB 11 to the DB device 10 (t3) and completes the input to the DB 11 (t4).

Then, the command generation processing unit 22 reads the virtual port construction data and the connection definition data (t5) and generates a command (t6). The command generation processing unit 22 generates a virtual port construction command on the basis of the virtual port construction data, and generates a server storage connection command on the basis of the connection definition data. The server storage connection command is a command for setting the server connection group information, the port connection group information, the storage connection group information, and the connection configuration information in the physical storage 1c.

Then, the command generation processing unit 22 transmits the virtual port construction command to the SVP 6c of the physical server 1a (t7). Then, the SVP 6c of the physical server 1a constructs the virtual port 6a (t8). Then, the command generation processing unit 22 transmits the server storage connection command to the SVP 5d of the physical storage is (t9). Then, the SVP 5d of the physical storage 1c performs server storage connection processing by setting the server connection group information, the port connection group information, the storage connection group information, and the connection configuration information in the physical storage is (t10).

Then, the command generation processing unit 22 generates a basic disk creation command MO and transmits the command to the SVP 5d of the physical storage 1c. The SVP 5d of the physical storage 1c creates a volume that implements the basic disk 6d (t12). Then, the command generation processing unit 22 generates a basic disk incorporating command (t13) and transmits the command to the SVP 6c of the physical server 1a. The SVP 6c of the physical server 1a incorporates the basic disk 6d (t14).

In this way, the command generation processing unit 22 generates the virtual port construction command and transmits the command to the SVP 6c, and generates the server storage connection command and transmits the command to the SVP 5d. Therefore, the information processing system 1 can connect the physical storage 1c to the physical server 1a via the virtual port 6a.

Figure 10:
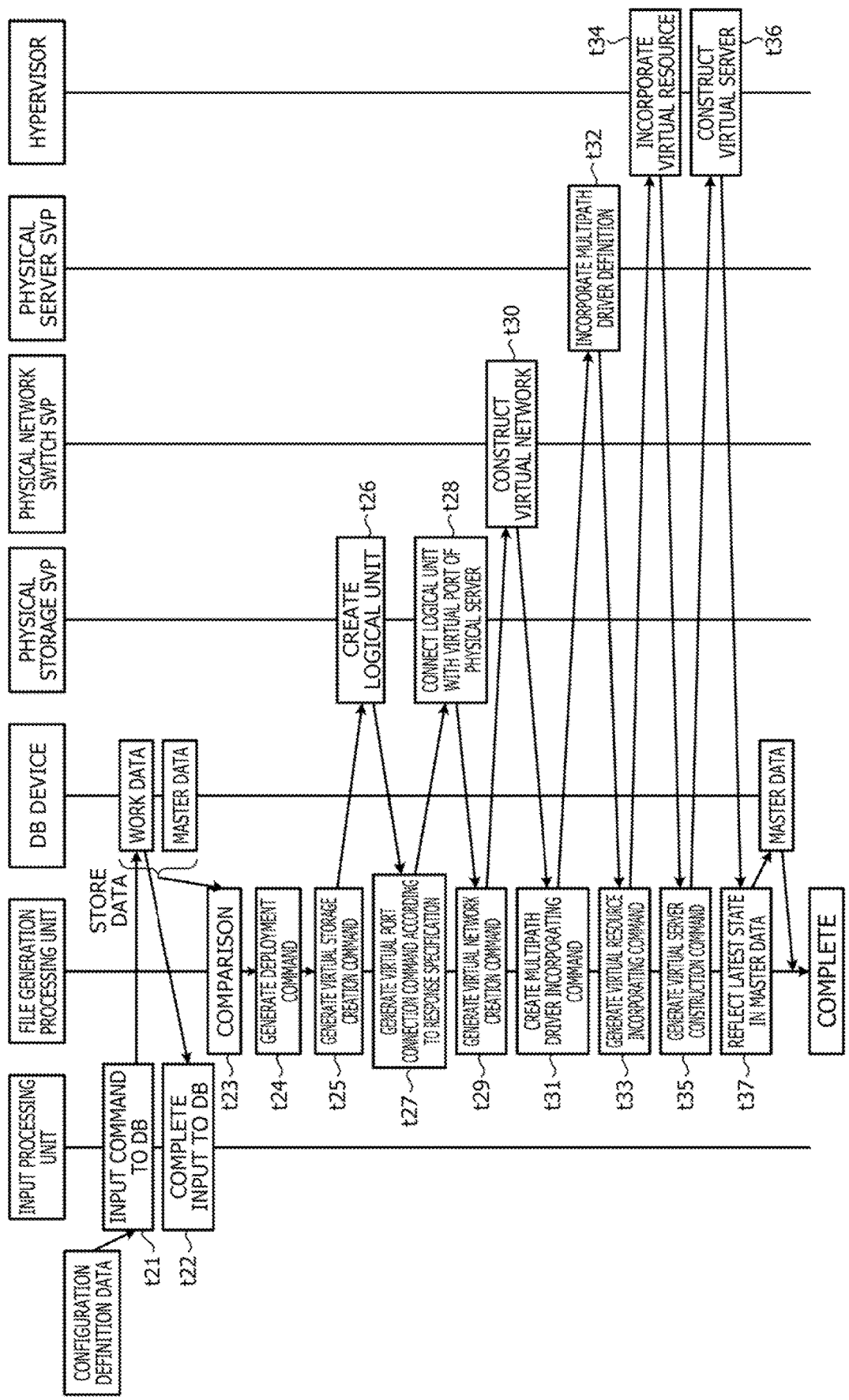
FIG. 10 is a diagram illustrating a sequence of configuration control processing by the management device.

Next, a sequence of processing by the management device 30 will be described with reference to FIGS. 10 and 11. FIG. 10 is a diagram illustrating a sequence of configuration control processing by the management device 30. As illustrated in FIG. 10, the input processing unit 31 inputs the configuration definition data, transmits an input command of the configuration definition data to the DB 11 to the DB device 10 (t21), and completes the input to the DB 11 (t22). The DB 11 stores the transmitted configuration definition data as work data 11b. Then, the file generation processing unit 32 compares the work data 11b with the master data 11a (t23), determines a deployment destination of the virtual resource from a usage status of the physical resource and a configuration of the virtual resource to be created, and generates a deployment command (t24).

Then, the file generation processing unit 32 generates a virtual storage creation command (t25) and transmits the command to the SVP 5d of the physical storage 1c. Then, the SVP 5d of the physical storage 1c creates the logical unit 5 that implements the virtual storage 2c (t26). Then, the file generation processing unit 32 generates the virtual port connection command according to the response specification (t27) and transmits the command to the SVP 5d of the physical storage 1c. Then, the SVP 5d of the physical storage 1c connects the logical unit 5 to the virtual port 6a of the physical server 1a (t28).

Then, the file generation processing unit 32 generates a virtual network creation command (t29) and transmits the command to the SVP 9e of the physical network switch 1e. Then, the SVP 9e of the physical network switch 1e constructs the virtual network (t30), Then, the file generation processing unit 32 generates a multipath driver incorporating command (t31) and transmits the command to the SVP 6c of the physical server 1a. The SVP 6c of the physical server 1a incorporates a multipath driver definition (t32).

Then, the file generation processing unit 32 generates a virtual resource incorporating command (t33) and transmits the command to the hypervisor 6b. Then, the hypervisor 6b then incorporates the virtual resources (t34). Then, the file generation processing unit 32 generates a virtual server construction command (t35) and transmits the command to the hypervisor 6b. The hypervisor 6b then constructs the virtual server 2a (t36). Then, the file generation processing unit 32 reflects the latest state in the master data 11a (t37).

In this way, since the file generation processing unit 32 generates the virtual port connection command and transmits the command to the SVP 5d, the information processing system 1 can connect the virtual port 6a to the logical unit 5.

Figure 11:
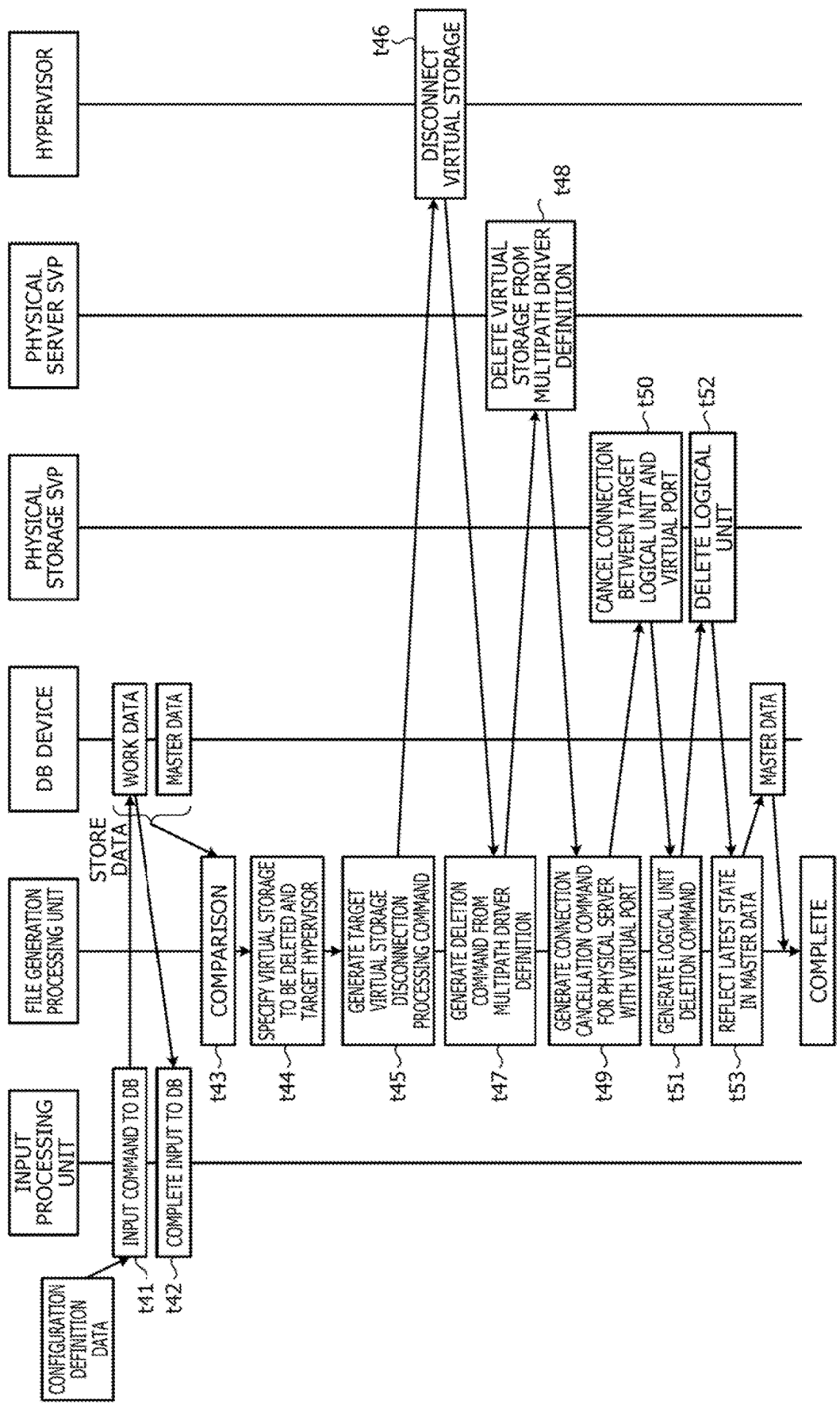
FIG. 11 is a diagram illustrating a sequence of virtual storage deletion processing by the management device.

FIG. 11 is a diagram illustrating a sequence of virtual storage deletion processing by the management device 30. As illustrated in FIG. 11, the input processing unit 31 inputs the configuration definition data, transmits an input command of the configuration definition data to the DB 11 to the DB device 10 (t41), and completes the input to the DB 11 (t42). The DB 11 stores the transmitted configuration definition data as work data 11b.

Then, the file generation processing unit 32 compares the work data lib with the master data 11a (t43) and identifies the virtual storage 2c to be deleted and the target hypervisor 6b (t44). Then, the file generation processing unit 32 generates a disconnection processing command for the target virtual storage 2c (t45) and transmits the command to the target hypervisor 6b. In the case of a shared storage, the file generation processing unit 32 transmits the disconnection processing command to the plurality of hypervisors 6b. Then, the hypervisor 6b disconnects the virtual storage 2c (t46).

Then, the file generation processing unit 32 generates a deletion command for the virtual storage 2c to be deleted from the multipath driver definition (t47), and transmits the command to the SVP 6c of the physical server 1a. In the case of a shared storage, the file generation processing unit 32 transmits the deletion command from the multipath driver definition to the plurality of SVPs 6c. The SVP 6c of the physical server 1a deletes the virtual storage 2c to be deleted from the multipath driver definition (t48).

Then, the file generation processing unit 32 generates a connection cancellation command (t49) of the physical server 1a with the virtual port 6a and transmits the command to the SVP 5d of the physical storage 1c. Then, the SVP 5d of the physical storage 1c cancels the connection of the target logical unit 5 with the virtual port 6a (t50). Then, the file generation processing unit 32 generates a logical unit deletion command (t51) and transmits the command to the SVP 5d of the physical storage 1c. Then, the SVP 5d of the physical storage 1c deletes the logical unit 5 (t52). Then, the file generation processing unit 32 reflects the latest state in the master data 11a (t53).

In this way, the file generation processing unit 32 generates the command to disconnect the virtual storage 2c to be deleted and transmits the command to the hypervisor 6b. Furthermore, the file generation processing unit 32 generates the connection cancellation command between the logical unit 5 to be deleted and the virtual port 6a and the deletion command of the logical unit 5 and transmits the commands to the SVP 5d of the physical storage 1c. Therefore, the information processing system 1 releases the area of the logical unit 5 that is no longer used and reuse the area as a new virtual storage area.

As described above, in the embodiment, the input processing unit 21 inputs the virtual port construction data and the connection definition data and stores the data in the DB device 10. Then, the command generation processing unit 22 generates the command for constructing the virtual port 6a on the physical port 6 on the basis of the virtual port construction data, and transmits the command to the physical server 1a. Furthermore, the command generation processing unit 22 generates the command for connecting the physical server 1a and the physical storage 1c via the virtual port 6a on the basis of the connection definition data, and transmits the command to the physical storage 1c. Therefore, the information processing system 1 can operate the plurality of virtual servers 2a that respectively execute pieces of middleware 2f having different response specifications on one physical server 1a, and can efficiently use the physical server 1a.

Furthermore, in the embodiment, the input processing unit 31 inputs the configuration definition data and stores the data in the DB device 10. Then, the file generation processing unit 32 generates the command for creating the virtual storage 2c and the command for connecting the logical unit 5 that implements the created virtual storage 2c to the virtual port 6a based on the configuration definition data, and writes the commands to the control file. Then, the file generation processing unit 32 transmits the control command to the physical storage 1c. Furthermore, the file generation processing unit 32 generates the command for incorporating the virtual storage 2c and the virtual server 2a and the command for constructing the virtual server 2a, writes the commands to the control file, and transmits the control command to the hypervisor 6b Therefore, the information processing system 1 can provide the virtual server 2a with the logical unit 5 having the response specification needed by the middleware 2f executed on the virtual server 2a.

Furthermore, in the embodiment, in the case where the configuration definition data is updated, the file generation processing unit 32 identifies the virtual storage 2c to be deleted, generates the command for disconnecting the specified virtual storage 2c and writes the command to the control file, and transmits the control command to the hypervisor 6b, Furthermore, the file generation processing unit 32 generates the command for canceling the connection of the logical unit 5 that implements the specified virtual storage 2c with the virtual port 6a and the command for deleting the logical unit 5 that implements the specified virtual storage 2c, and writes the commands to the control file. Then, the file generation processing unit 32 transmits the control command to the physical storage 1c. Therefore, the information processing system 1 can collect and reuse the logical unit 5 that is no longer used.

Note that, in the embodiment, the case in which the construction device 20 and the management device 30 are different devices has been described, but the construction device 20 and the management device 30 may be one construction management device.

Furthermore, in the embodiment, the construction device 20 and the management device 30 have been described. However, by implementing the configuration of the construction device 20 and the management device 30 by software, a construction management program having a similar function can be obtained. Therefore, a computer that executes the construction management program will be described.

Figure 12:
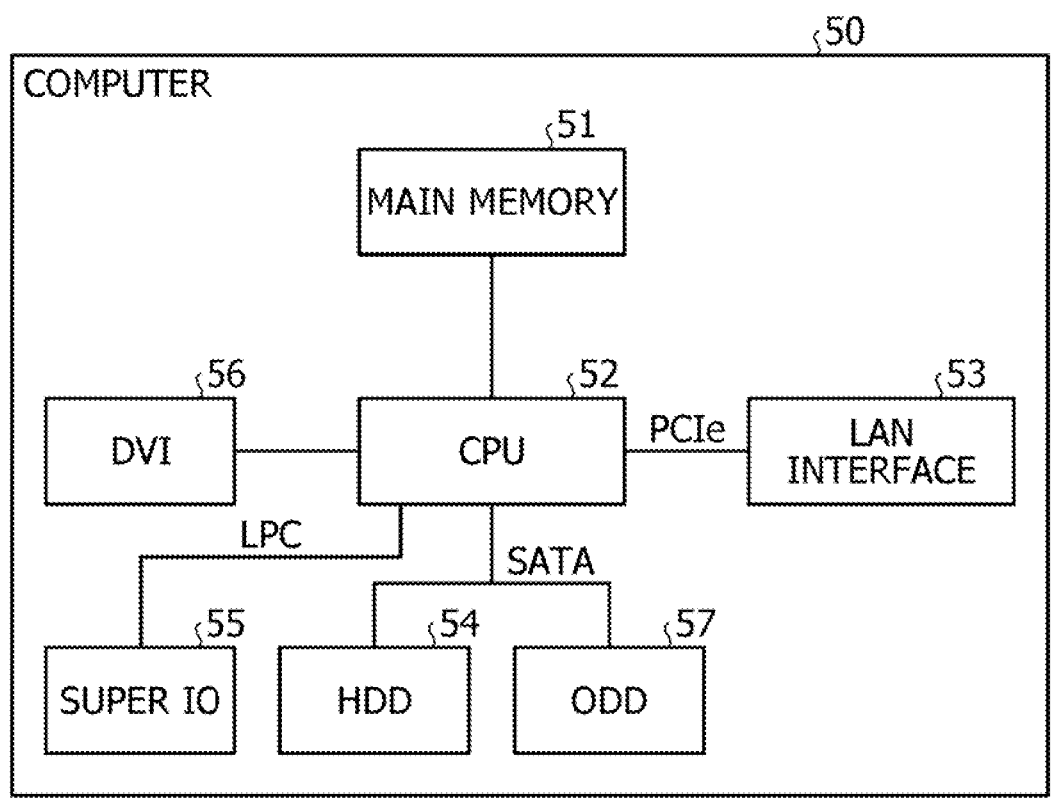
FIG. 12 is a diagram illustrating a hardware configuration of a computer that executes a construction management program according to an embodiment.

FIG. 12 is a diagram illustrating a hardware configuration of a computer that executes the construction management program according to the embodiment. As illustrated in FIG. 12, a computer 50 includes a main memory 51, a CPU 52 that is an example of a processor, a local area network (LAN) interface 53, and a hard disk drive (HDD) 54. Furthermore, the computer 50 includes a super input output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads and executes the program from the main memory 51. The CPU 52 includes a chipset having a memory controller.

The LAN interface 53 is an interface for connecting the computer 50 to another computer via a LAN. The HDD 54 is a disk device that stores programs and data, and the super IO 55 is an interface for connecting an input device such as a mouse and a keyboard. The DVI 56 is an interface for connecting a liquid crystal display device, and the ODD 57 is a device for reading and writing a DVD or compact disc recordable (CD-R).

The LAN interface 53 is connected to the CPU 52 by PCI express (PCIe), and the HDD 54 and the ODD 57 are connected to the CPU 52 by serial advanced technology attachment (SATA). The super IO 55 is connected to the CPU 52 by low pin count (LPC).

Then, the construction management program executed by the computer 50 is stored in a CD-R that is an example of a recording medium that can be read by the computer 50 and is read from the CD-R by the ODD 57 and installed to the computer 50. Alternatively, the construction management program is stored in a database or the like of another computer system connected via the LAN interface 53 and is read from these databases and is installed to the computer 50. Then, the installed construction management program is stored in the HDD 54, is read to the main memory 51, and is executed by the CPU 52.

Furthermore, in the cloud computing platform, a spare machine for the physical server 1a may be prepared in advance. In this case, when an error has occurred in the physical server 1a, the logical unit 5 used by the physical server 1a in which the error has occurred is disconnected from the physical server 1a in which the error has occurred and connected to the spare machine. Then, the spare machine boots the OS from the logical unit 5 and continues the operation.

Figure 13:
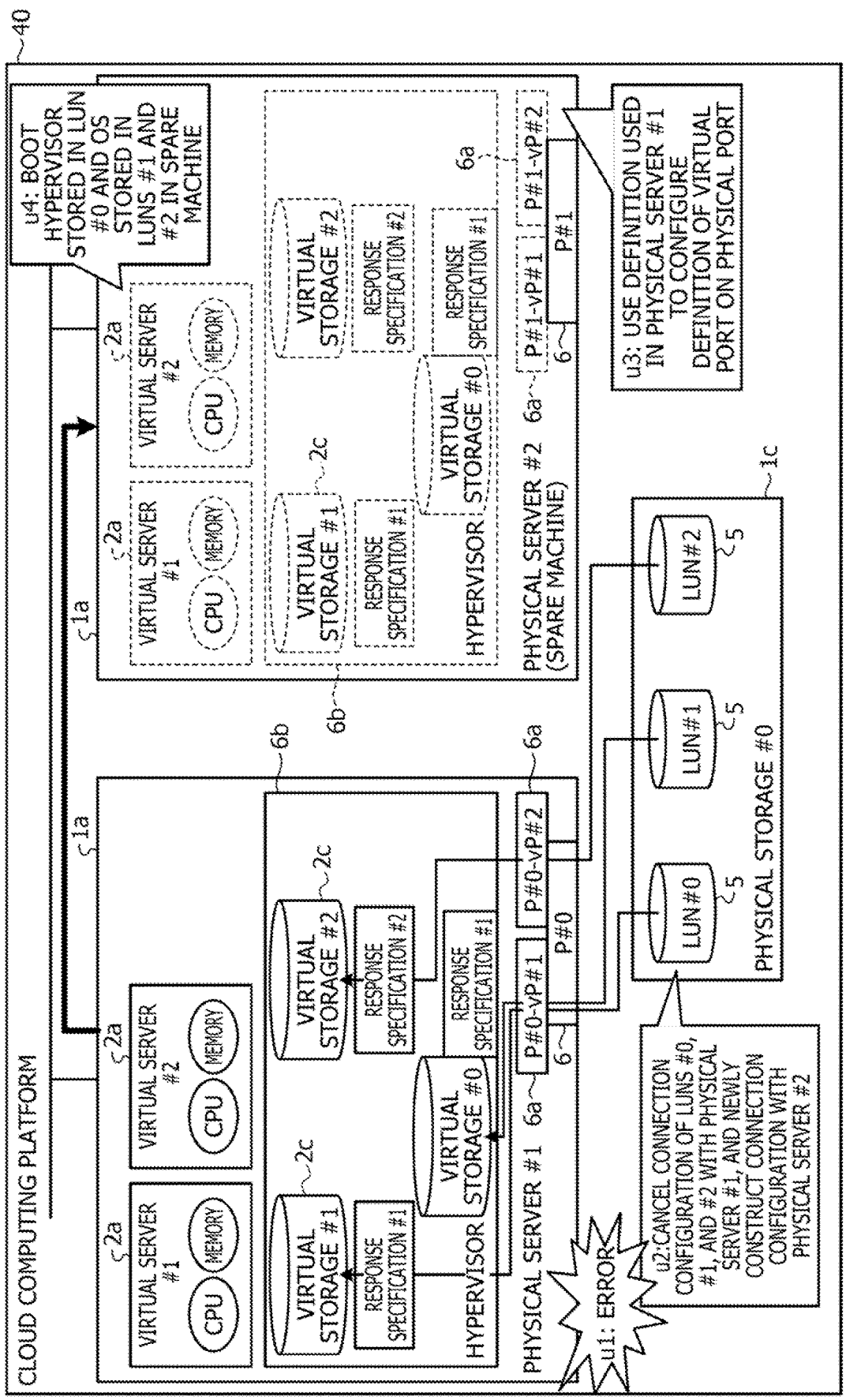
FIG. 13 is a diagram illustrating a switching procedure to a spare machine.

When an error has occurred in the physical server 1a in the state where the one physical server 1a uses the logical units 5 having a plurality of response specifications, switching to the spare machine is performed. FIG. 13 is a diagram illustrating a switching procedure to the spare machine. As illustrated in FIG. 13, the virtual server #1 and the virtual server #2 are operating on the physical server #1, in addition to the hypervisor 6b. LUN #0 and the LUN #1 of the response specification #1 are connected to the virtual server #1 at the virtual port 6a of P #0-vP #1, and the LUN #2 of the response specification #2 is connected to the virtual server #2 with P #0-vP #2. The LUN #0 is used as the basic disk 6d used for starting the hypervisor 6b, the LUN #1 is used by the virtual server #1, and the LUN #2 is used by the virtual server #2.

In the cloud computing platform 40, an error occurs in the physical server #1 (u1). Then, the construction device 20 and the management device 30 cancel the connection configuration of the logical unit 5 connected to the physical server #1 in a physical storage #0, and newly construct a connection configuration with the physical server #2 (u2). Thereafter, the construction device 20 and the management device 30 newly define a connection configuration between the physical storage #0 and the physical server #2. The virtual port 6a at that time is constructed with the information of the virtual port 6a of P #0-vP #1 and P #0-vP #2 used in the physical server #1 (u3). Thereafter, the management device 30 boots the hypervisor 6b on the physical server #2 with the LUN #0 in which the hypervisor 6b is stored. Thereafter, the management device 30 constructs the virtual network, incorporates the multipath driver definition, and incorporates the virtual resources on the basis of configuration definition information of the virtual server #1 and the virtual server #2 recorded in the DB 11, and then boots the OS stored by the LUN #1 and the LUN #2 (u4).

Therefore, the information processing system 1 can continue the operation in the physical server #2 while the logical units 5 having a plurality of response specifications coexist.

Note that the command generation processing unit 22 generates a command for canceling the connection of the physical storage #0 connected to the physical server #1, and the command for connecting the physical server #2 and the physical storage #0, and transmits the generated commands to the SVP 5d of the physical storage 1c.

Furthermore, the file generation processing unit 32 generates a command for canceling the connection of the LUN #0 and the LUN #1 with P #0-vP #1 and a command for canceling the connection of the LUN #2 with P #0-vP #2, and transmits the generated commands to the SVP 5d of the physical storage 1c. The file generation processing unit 32 generates a command for connecting the LUN #0 and the LUN #1 with P #1-vP #1 and a command for connecting the LUN #2 with P #1-vP #2, and transmits the generated command's to the SVP 5d of the physical storage 1c.

Figure 14:
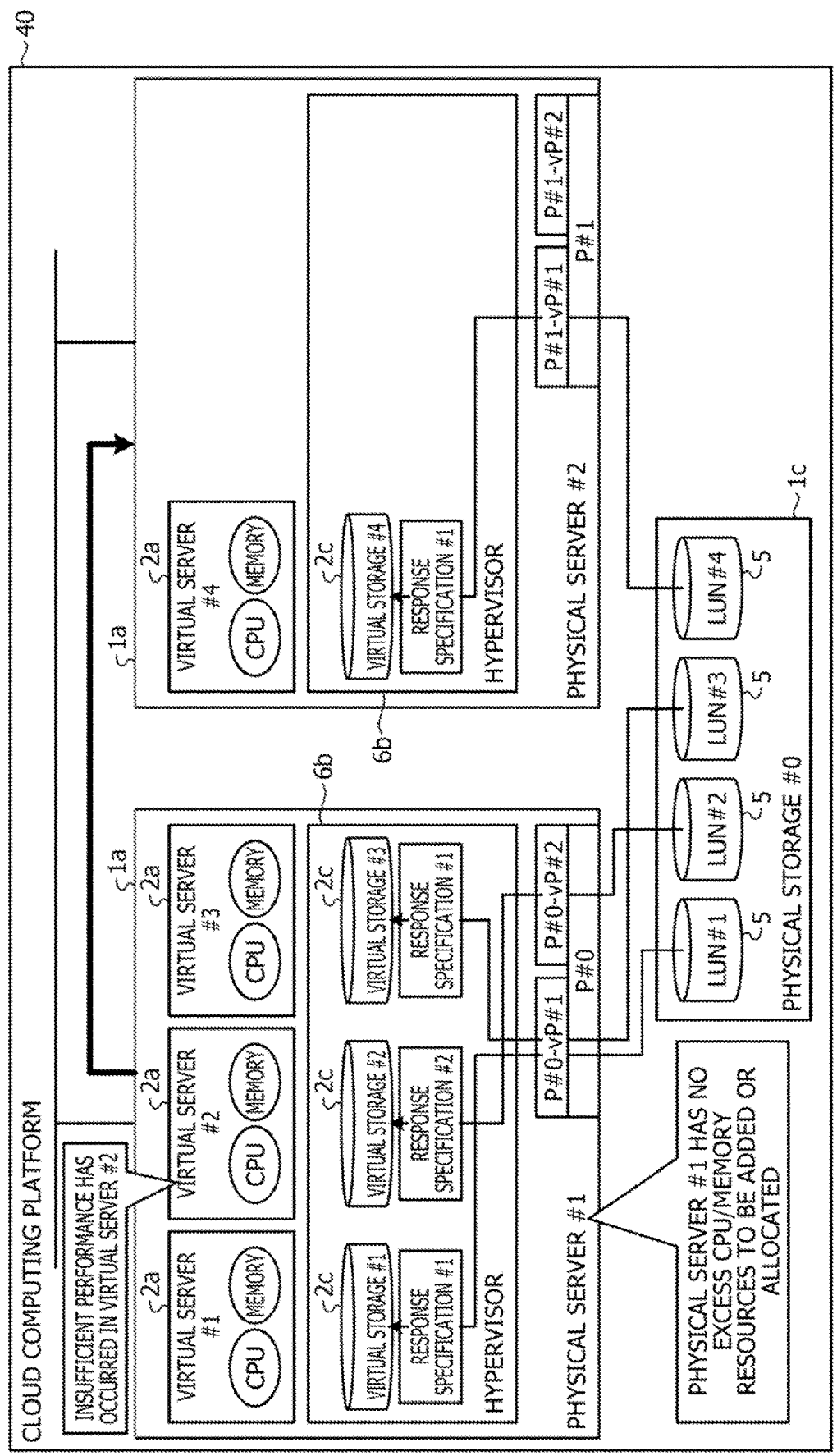
FIG. 14 is a first diagram illustrating movement of a virtual server.
Figure 15:
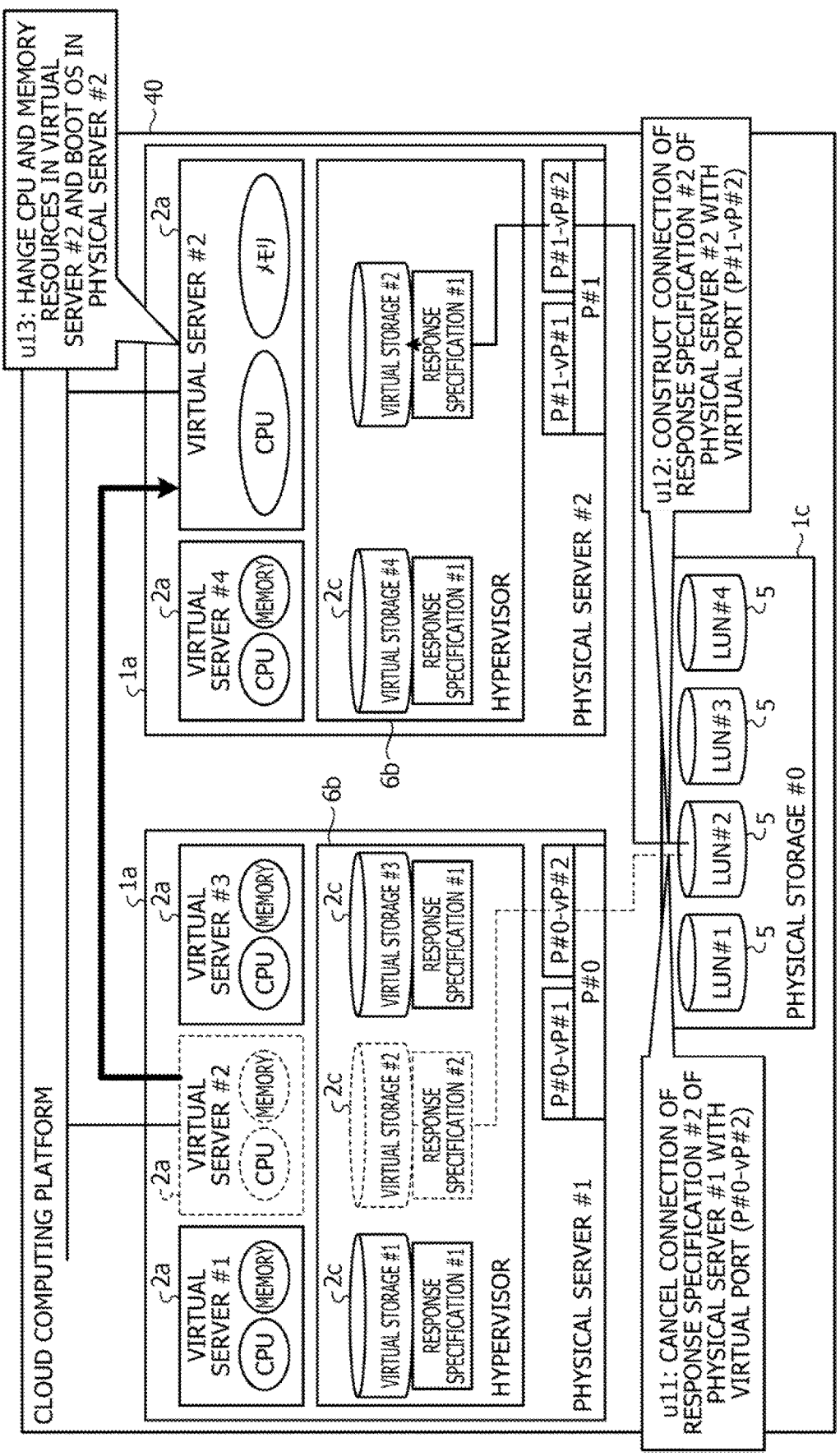
FIG. 15 is a second diagram illustrating movement of a virtual server.

FIGS. 14 and 15 are diagrams illustrating movement of the virtual server 2a. As illustrated in FIG. 14, in the cloud computing platform 40, in a case where the virtual servers #1 to #3 are operating on the physical server #1 and the virtual server #4 is operating on the physical server #2, the virtual server #2 may experience insufficient performance of resources such as the CPU and memory. At this time, there is a case where the physical server #1 has no excess resources and the virtual server 2a needs to move to a physical server having excess resources.

Note that, in this example, it is assumed that a virtual port P #0-vP #1 for the response specification #1 and a virtual port P #0-vP #2 for the response specification #2 are constructed on a physical port P #0 on the physical server #1. Furthermore, it is assumed that a virtual port P #1-vP #1 for the response specification #1 and a virtual port P #1-vP #2 for the response specification #2 are constructed on the physical port P #1 in the physical server #2. Furthermore, it is assumed that the physical server #2 has excess resources.

In this case, FIG. 15 illustrates the procedure for moving the virtual server #2 to the physical server #2. First, the management device 30 performs connection cancellation processing for the LUN #2 used in the virtual server #2 with the virtual port P #0-vP #2 for the response specification #2 of the physical server #1 on which the virtual server #2 is operating, in the physical storage #0 (u11). Next, the management device 30 performs connection processing for the LUN #2 with the virtual port P #1-vP #2 for the response specification #2 of the destination physical server #2 (u12).

Thereby, the use of the LUN #2 of the response specification #2 becomes available on the physical server #2. Next, the management device 30 constructs the virtual network, incorporates the multipath driver definition, and incorporates the virtual resources in the physical server #2 on the basis of the configuration definition information of the virtual server #2 recorded in the DB 11. At this time, the management device 30 changes the resources of the CPU and the memory. Thereafter, the management device 30 boots the OS stored in the LUN #2 on the physical server #2 (u13).

Therefore, the information processing system 1 can move the virtual server 2a even in the case where a plurality of virtual servers 2a having different response specifications operate on one physical server 1a, and can reinforce the resources.

Note that the file generation processing unit 32 generates a command for canceling the connection between the virtual port P #0-vP #2 of the physical server #1 and the LUN #2, and transmits the generated command to the SVP 6c of the physical server #1. Furthermore, the file generation processing unit 32 generates a command for connecting the virtual port P #1-vP #2 of the physical server #2 with the LUN #2, and transmits the generated command to the SVP 6c of the physical server #2. Furthermore, the file generation processing unit 32 generates a command for configuring the LUN #2 and the virtual server #2 and a command for starting the virtual server #2 on the physical server #2, and transmits the generated commands to the hypervisor 6b of the physical server #2.

Figure 16:
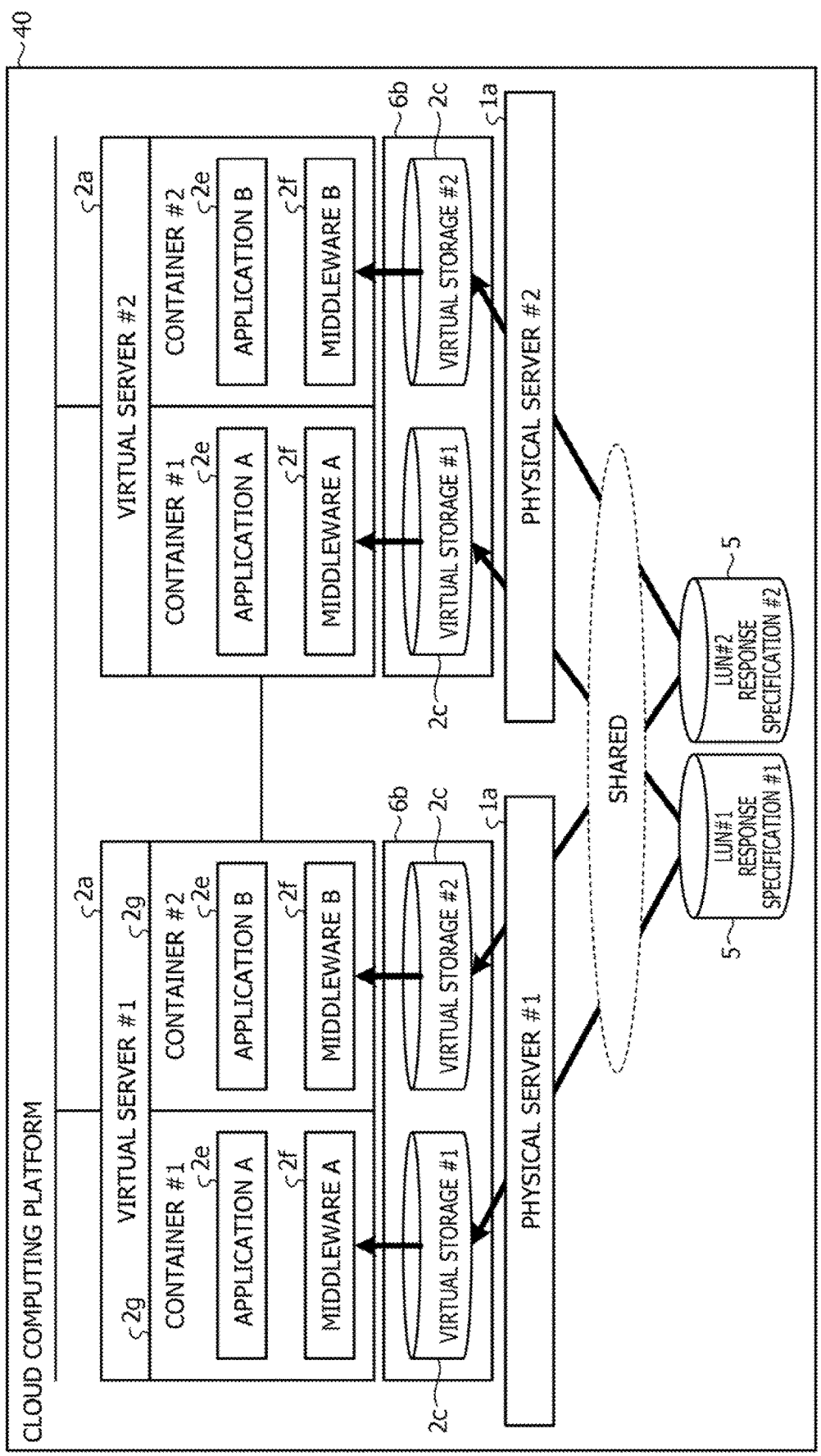
FIG. 16 is a diagram illustrating a case in which one virtual server uses virtual storages having different response specifications.

FIG. 16 is a diagram illustrating a case in which one virtual server 2a uses the virtual storages 2c having different response specifications. In FIG. 16, the virtual server 2a is divided by hosting-type virtual servers, where containers 2g represented by a container #1 and a container #2 are the hosting-type virtual servers. An application 2e and the middleware 2f are executed in the container 2g. As illustrated in FIG. 16, the respective hosting-type virtual servers use the virtual storages 2c having different response specifications.

Figure 17:
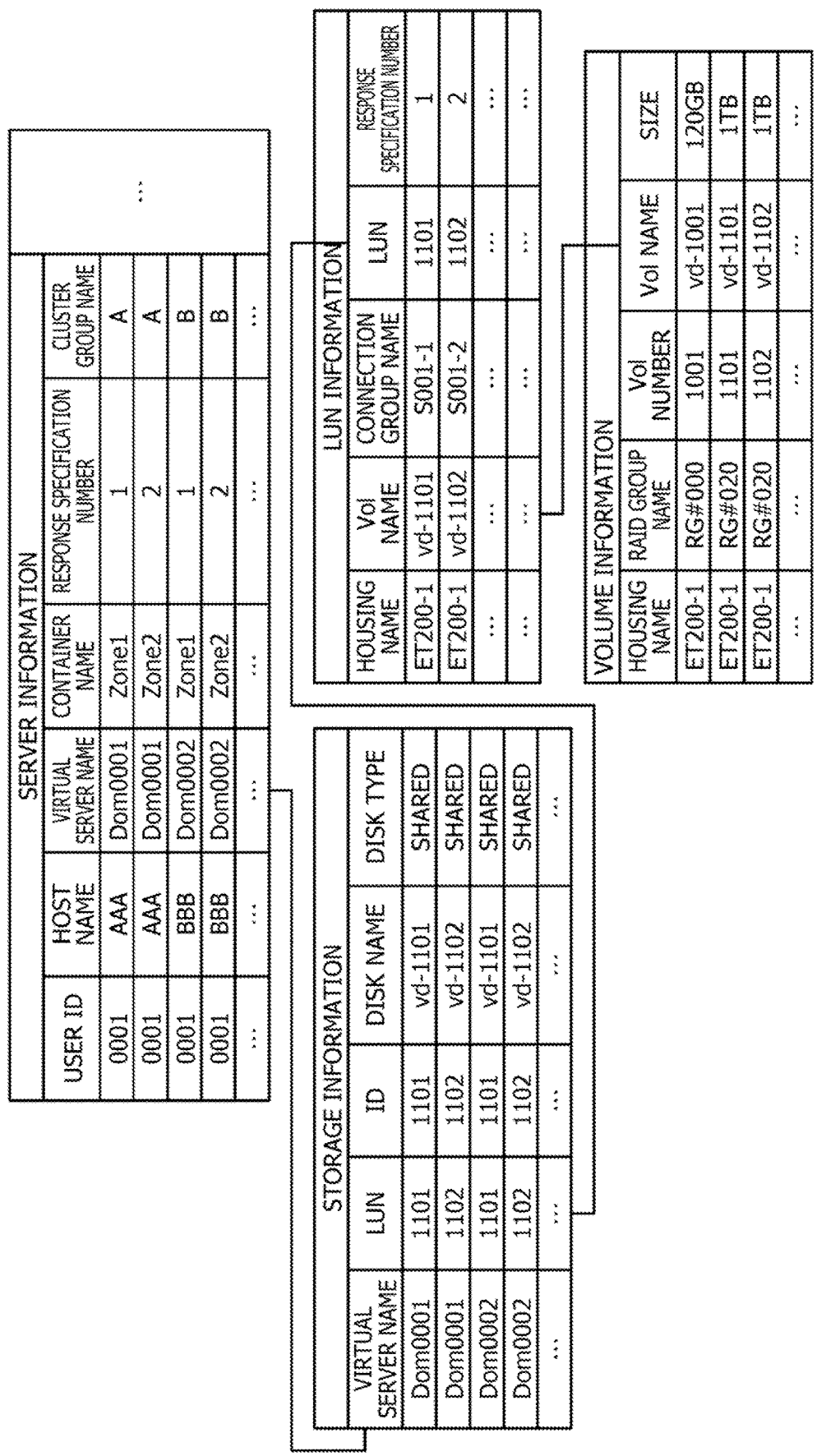
FIG. 17 is a diagram illustrating configuration definition data of a hosting-type virtual server environment.

FIG. 17 is a diagram illustrating configuration definition data of a hosting-type virtual server environment. Compared with FIG. 5, in FIG. 17, a container name is added to the server information, and the response specification and the cluster group name are associated with the container 2g.

In this way, the information processing system 1 can implement the hosting-type virtual server that operates the pieces of middleware 2f having different response specifications in one virtual server. Note that the file generation processing unit 32 generates a command for constructing the containers 2g in the virtual server 2a on the basis of the configuration definition data illustrated in FIG. 17, and transmits the generated command to the hypervisor 6b.

Figure 18:
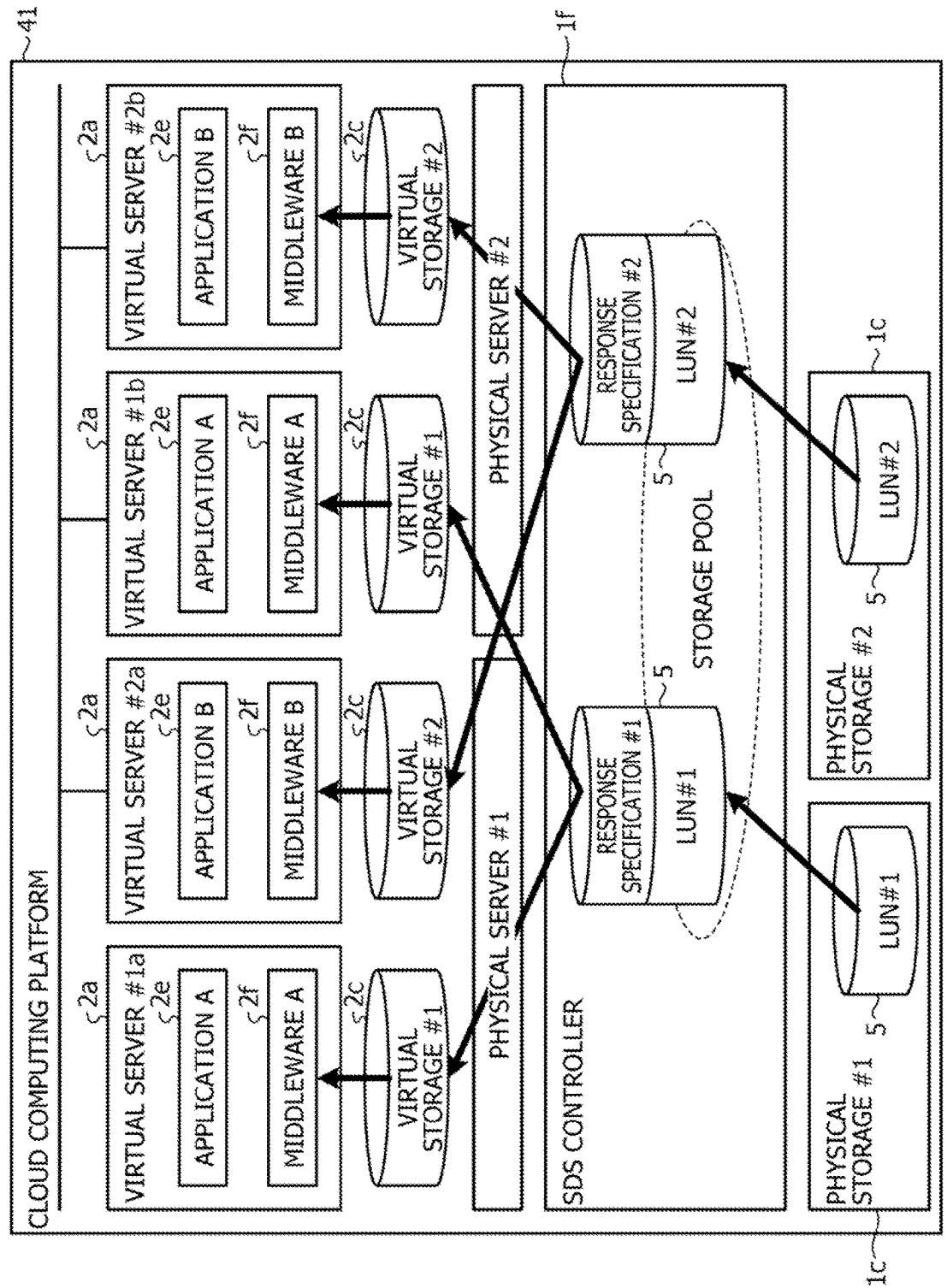
FIG. 18 is a diagram illustrating an example of a cloud computing platform using a software defined storage (SDS)
Figure 19:
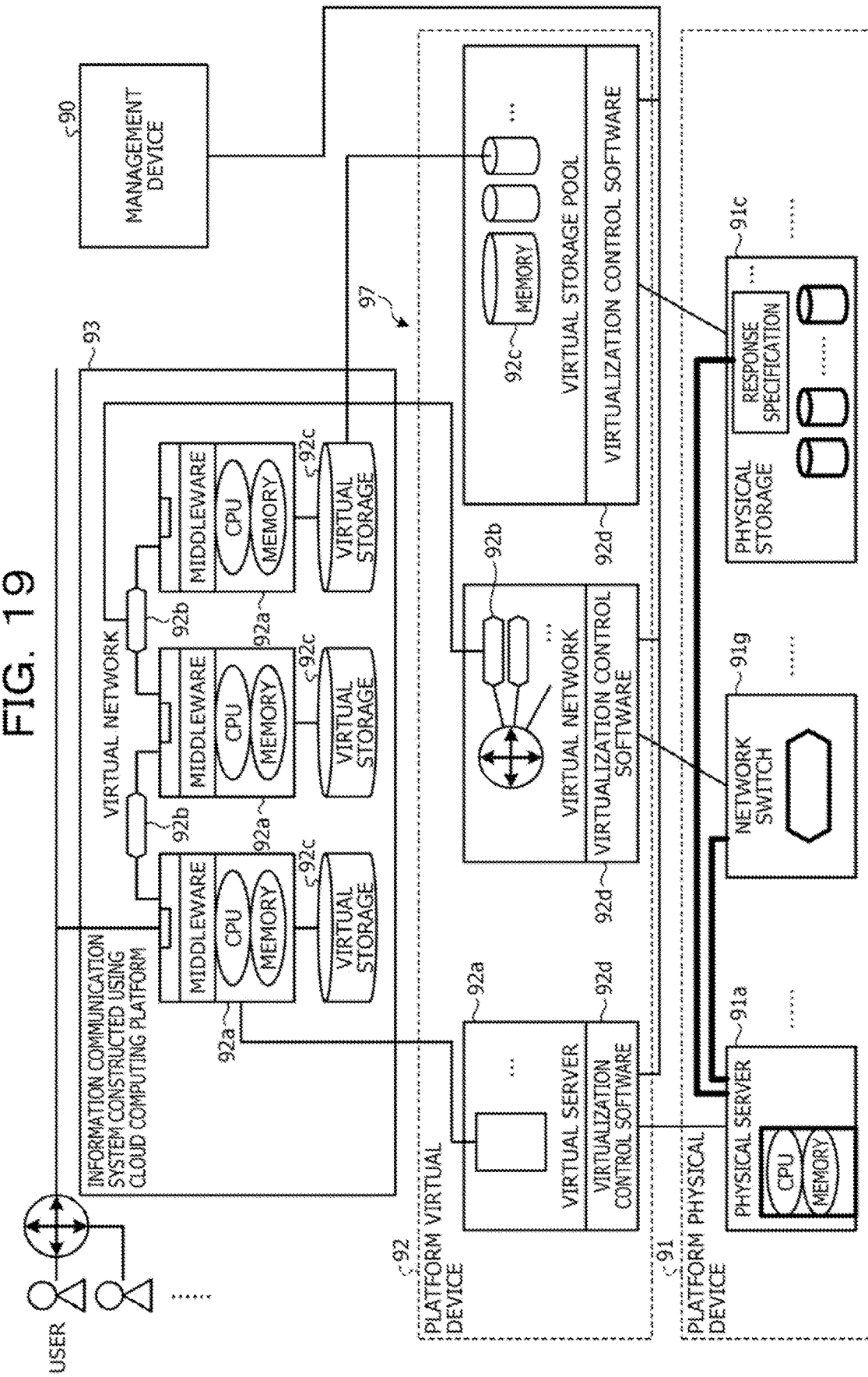
FIG. 19 is a diagram illustrating an example of an information communication system constructed using a cloud computing platform.
Figure 20A:
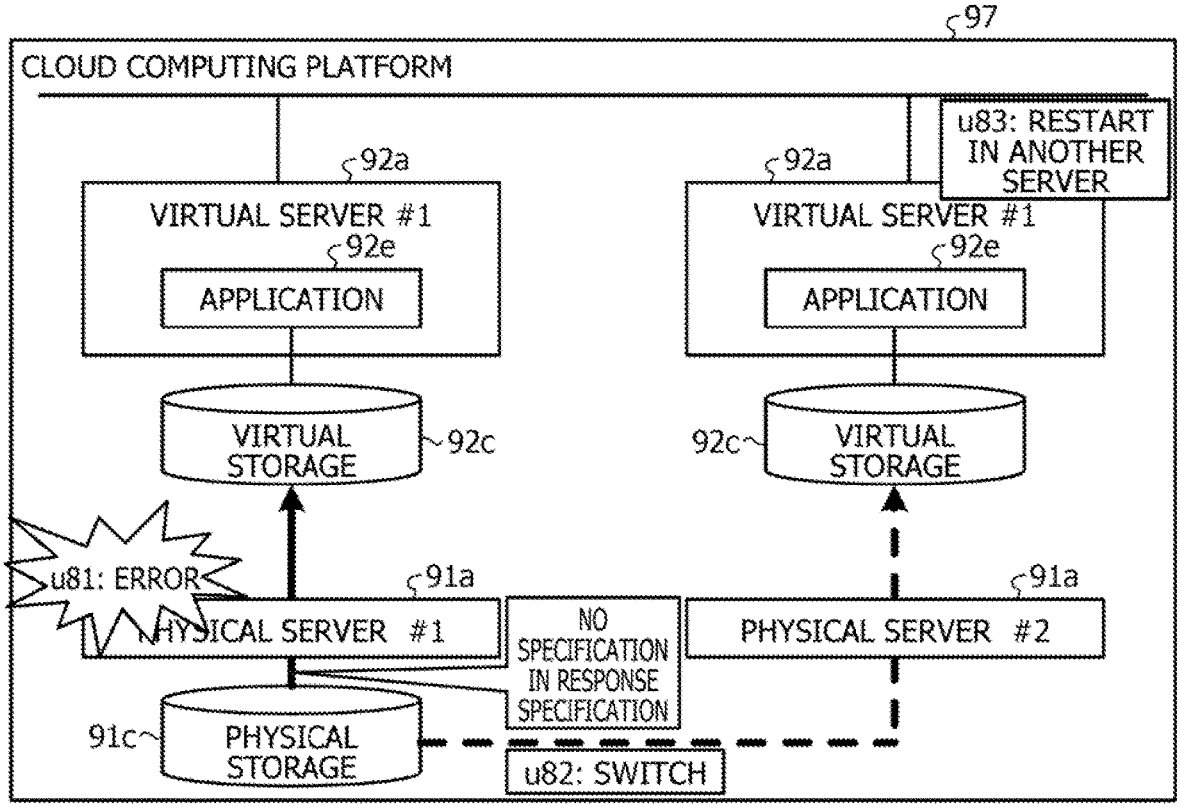
FIG. 20A is diagram for describing a first method for ensuring availability in an information communication system constructed using a cloud computing platform.
Figure 20B:
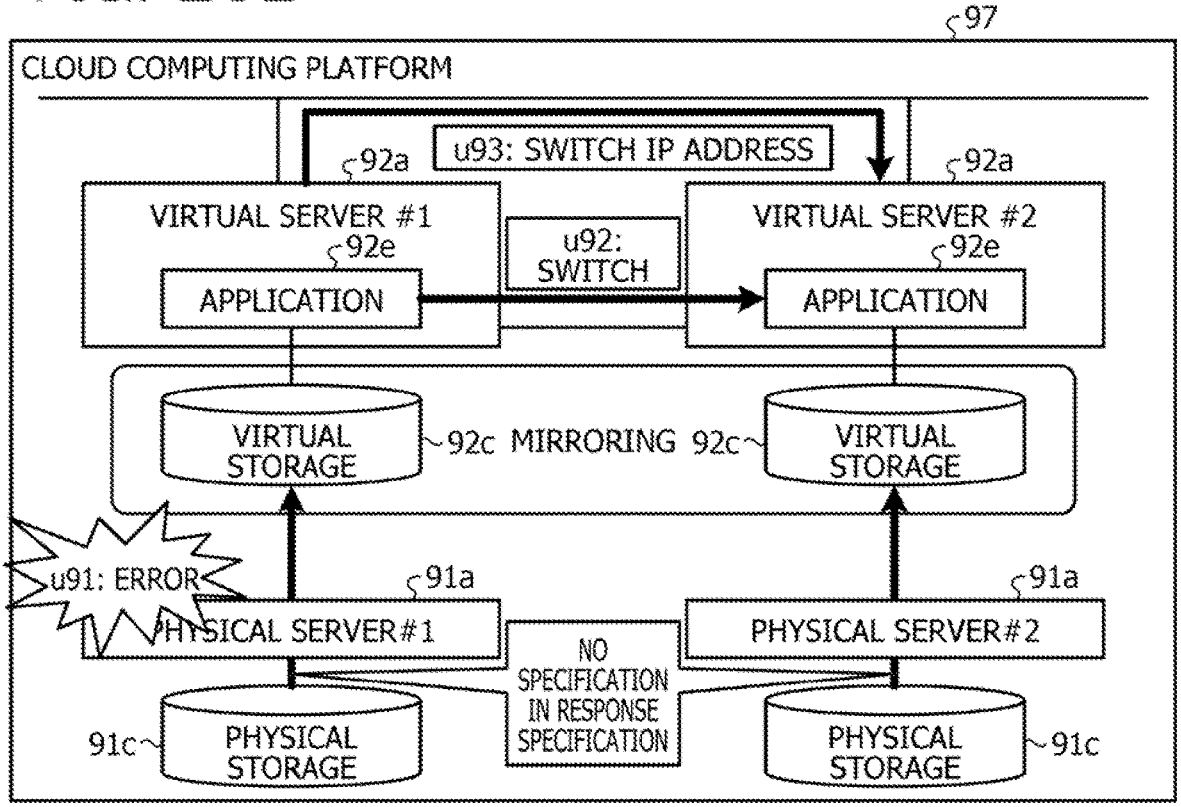
FIG. 20B is diagram for describing a second method for ensuring availability in an information communication system constructed using a cloud computing platform.
Figure 21:
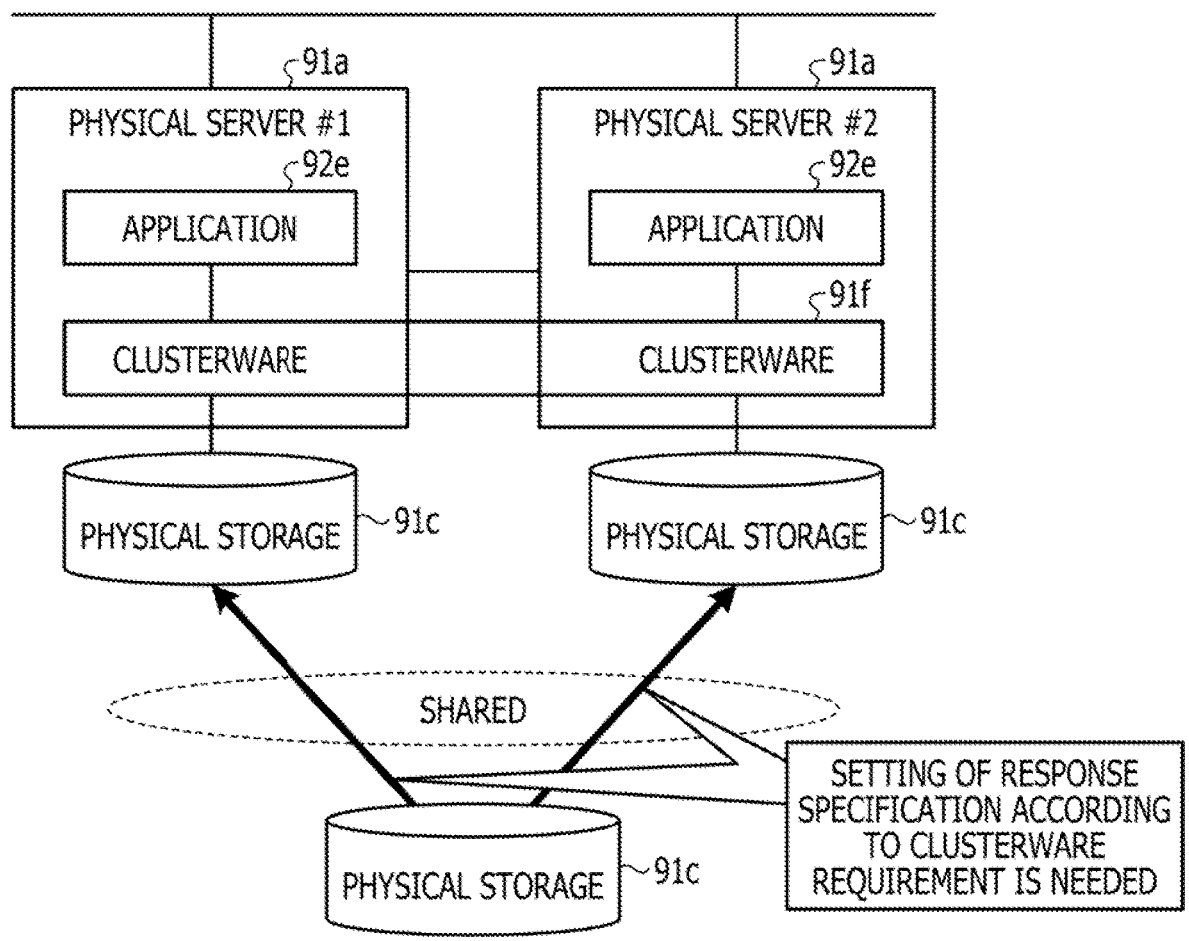
FIG. 21 is a diagram illustrating a configuration of an on-pre based cluster system.

FIG. 18 is a diagram illustrating an example of a cloud computing platform using a software defined storage (SOS).

As illustrated in FIG. 18, a cloud computing platform 41 includes an SDS controller 1f. The SOS controller if manages the LUN #1 included in the physical storage #1, the LUN #2, included in the physical storage #2, and the like, as a storage pool. The SDS controller if can supply the logical unit 5 that satisfies the response specification of the middleware 2f by setting the response specification in the logical unit 5 on the storage pool on the basis of the connection definition data and the configuration definition data.

In FIG. 18, the LUN #1 that satisfies the response specification #1 of middleware A is supplied to the virtual server #a1 and the virtual server #a2, and the LUN #2 that satisfies the response specification #2 of middleware B is supplied to the virtual server #b1 and the virtual server #b2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A construction management device comprising:
a memory; and
a processor connected to the memory and configured to:
acquire virtual port construction data and connection definition data, the virtual port construction data being data for associating a plurality of virtual ports with a physical port used by a physical server for data transfer with a physical storage, and associating a response specification requested by middleware executed by a virtual server that operates in the physical server with each virtual port, the connection definition data being data for associating the virtual port with the physical storage,
generate a first command for constructing the plurality of virtual ports in the physical port based on the virtual port construction data,
transmit the first command to the physical server,
generate a second command for connecting the physical server and the physical storage via the virtual port based on the connection definition data,
transmit the second command to the physical storage,
acquire configuration definition data for associating the physical server and the virtual server with a logical unit provided by the physical storage,
generate a third command and a fourth command based on the configuration definition data, the third command being a command for creating the logical unit in the physical storage, the fourth command being a command for connection of the logical unit with the virtual port,
transmit the third command and the fourth command to the physical storage,
generate a fifth command and a sixth command, the fifth command being a command for incorporating the logical unit and the virtual server and the sixth command being a command for constructing the virtual server,
transmit the fifth command and the sixth command commands to a hypervisor, the hypervisor operating in the physical server and controls the virtual server,
generate a seventh command and an eighth command when an error has occurred in the physical server, the seventh command being a command for canceling the connection between the physical server and the physical storage via the virtual port, the eighth command being a command for constructing connection between a spare physical server and the physical storage via the virtual port,
transmit the seventh command and the eighth command to the physical storage,
generate a ninth command and a tenth command when an error has occurred in the physical server, the ninth command being a command for canceling the connection between the virtual port of the physical server and the logical unit, the tenth command being a command for constructing connection between the virtual port of the spare physical server and the logical unit, and
transmit the ninth command and the tenth command to the physical storage.

2. The construction management device according to claim 1, wherein the logical unit is shared by a plurality of the virtual servers including the virtual server respectively operating in a plurality of a physical servers including the physical server.

3. The construction management device according to claim 1, wherein, the processor is further configured to:
acquire updated configuration definition data,
specify a virtual storage to be deleted, based on the updated configuration definition data and the configuration definition data,
generate an eleventh command for disconnecting the specified virtual storage,
transmit the eleventh command to the hypervisor,
generate a twelfth command and a thirteenth command, the twelfth command being a command for canceling the connection of the logical unit for implementing the specified virtual storage with the virtual port, the thirteenth command being a command for deleting the logical unit, and
transmit the twelfth command and the thirteenth command to the physical storage.

4. The construction management device according to claim 1, wherein the processor is further configured to:
generate a fourteenth command and a fifteenth command when the virtual server is moved to another physical server, the fourteenth command being command for canceling the connection between the virtual port to which the virtual server is connected and the logical unit, the fifteenth command being a command for connecting the logical unit to a virtual port constructed in a physical port of the another physical server,
transmit the fourteenth command and the fifteenth command to the physical storage,
generate a sixteenth command and a seventeenth command, the sixteenth command being a command for incorporating a virtual storage implemented by the logical unit and the virtual server and the seventeenth command being a command for constructing the virtual server, and
transmit the sixteenth command and the seventeenth command to a hypervisor operating in the destination physical server.

5. The construction management device according to claim 1, wherein
the virtual port construction data associates the response specification requested by middleware executed in a container constructed by a virtual server that operates in the physical server with each virtual port, the configuration definition data associates the physical server, the virtual server, the container, and the logical unit, and the processor is further configured to:

generate an eighteenth command and a nineteenth command, the eighteenth command being a command for incorporating a virtual storage implemented by the logical unit and the virtual server, the nineteenth command being a command for constructing the virtual server and the container, and transmit the eighteenth command and the nineteenth command to the hypervisor.

6. The construction management device according to claim 1, wherein the logical unit is provided from the physical storage via a software defined storage (SDS) controller.

7. An information processing system comprising:

one or more memories; and one or more processors coupled to the one or more memories and the one or more processors configured to:

acquire virtual port construction data and connection definition data, the virtual port construction data being data for associating a plurality of virtual ports with a physical port used by a physical server for data transfer with a physical storage, and associating a response specification requested by middleware executed by a virtual server that operates in the physical server with each virtual port, the connection definition data being data for associating the virtual port with the physical storage, generate a first command for constructing the plurality of virtual ports in the physical port based on the virtual port construction data, transmit the first command to the physical server, generate a second command for connecting the physical server and the physical storage via the virtual port based on the connection definition data, and transmit the second command to the physical storage, acquire configuration definition data for associating the physical server and the virtual server with a logical unit provided by the physical storage, generate a third command and a fourth command based on the configuration definition data, the third command being a command for creating the logical unit in the physical storage, the fourth command being a command for connection of the logical unit with the virtual port, transmit the third command and the fourth command to the physical storage, generate a fifth command and a sixth command, the fifth command being a command for incorporating the logical unit and the virtual server and the sixth command being a command for constructing the virtual server, transmit the fifth command and the sixth command commands to a hypervisor, the hypervisor operating in the physical server and controls the virtual server, generate a seventh command and an eighth command when an error has occurred in the physical server, the seventh command being a command for canceling the connection between the physical server and the physical storage via the virtual port, the eighth command being a command for constructing connection between a spare physical server and the physical storage via the virtual port, transmit the seventh command and the eighth command to the physical storage, generate a ninth command and a tenth command when an error has occurred in the physical server, the ninth command being a command for canceling the connection between the virtual port of the physical server and the logical unit, the tenth command being a command for constructing connection between the virtual port of the spare physical server and the logical unit, and transmit the ninth command and the tenth command to the physical storage.

8. The information processing system according to claim 7, wherein the logical unit is shared by a plurality of the virtual servers including the virtual server respectively operating in a plurality of a physical servers including the physical server.

9. The information processing system according to claim 7, wherein the one or more processors are further configured to:

acquire updated configuration definition data, specify a virtual storage to be deleted, based on the updated configuration definition data and the configuration definition data, generate an eleventh command for disconnecting the specified virtual storage, transmit the eleventh command to the hypervisor, generate a twelfth command and a thirteenth command, the twelfth command being a command for canceling the connection of the logical unit for implementing the specified virtual storage with the virtual port, the thirteenth command being a command for deleting the logical unit, and transmit the twelfth command and the thirteenth command to the physical storage.

10. A non-transitory computer-readable storage medium storing a program that causes a processor included in a noise estimation apparatus to execute a process, the process comprising:

acquiring virtual port construction data and connection definition data, the virtual port construction data being data for associating a plurality of virtual ports with a physical port used by a physical server for data transfer with a physical storage, and associating a response specification requested by middleware executed by a virtual server that operates in the physical server with each virtual port, the connection definition data being data for associating the virtual port with the physical storage;

generating a first command for constructing the plurality of virtual ports in the physical port based on the virtual port construction data;

transmitting the first command to the physical server;

generating a second command for connecting the physical server and the physical storage via the virtual port based on the connection definition data; and transmitting the second command to the physical storage, acquiring configuration definition data for associating the physical server and the virtual server with a logical unit provided by the physical storage;

generating a third command and a fourth command based on the configuration definition data, the third command being a command for creating the logical unit in the physical storage, the fourth command being a command for connection of the logical unit with the virtual port;

transmitting the third command and the fourth command to the physical storage;

generating a fifth command and a sixth command, the fifth command being a command for incorporating the logical unit and the virtual server and the sixth command being a command for constructing the virtual server;

transmitting the fifth command and the sixth command commands to a hypervisor, the hypervisor operating in the physical server and controls the virtual server;

generating a seventh command and an eighth command when an error has occurred in the physical server, the seventh command being a command for canceling the connection between the physical server and the physical storage via the virtual port, the eighth command being a command for constructing connection between a spare physical server and the physical storage via the virtual port;

transmitting the seventh command and the eighth command to the physical storage;

generating a ninth command and a tenth command when an error has occurred in the physical server, the ninth command being a command for canceling the connection between the virtual port of the physical server and the logical unit, the tenth command being a command for constructing connection between the virtual port of the spare physical server and the logical unit; and transmitting the ninth command and the tenth command to the physical storage.

11. The non-transitory computer-readable storage medium according to claim 10, wherein the logical unit is shared by a plurality of the virtual servers including the virtual server respectively operating in a plurality of a physical servers including the physical server.

12. The non-transitory computer-readable storage medium according to claim 10, wherein the process further comprising:

acquiring updated configuration definition data;

specifying virtual storage to be deleted, based on the updated configuration definition data and the configuration definition data;

generating an eleventh command for disconnecting the specified virtual storage;

transmitting the eleventh command to the hypervisor;

generating a twelfth command and a thirteenth command, the twelfth command being a command for canceling the connection of the logical unit for implementing the specified virtual storage with the virtual port, the thirteenth command being a command for deleting the logical unit, and transmitting the twelfth command and the thirteenth command to the physical storage.

* * * * *